(12) United States Patent
Nakae et al.

(10) Patent No.: US 7,694,522 B2
(45) Date of Patent: Apr. 13, 2010

(54) HEAT EXCHANGING WALL, GAS TURBINE USING THE SAME, AND FLYING BODY WITH GAS TURBINE ENGINE

(75) Inventors: Tomoyoshi Nakae, Aichi (JP); Kenichiro Takeishi, Hyogo (JP); Masaaki Matsuura, Hyogo (JP); Tsuyoshi Kitamura, Hyogo (JP); Atsushi Moriwaki, Hyogo (JP)

(73) Assignees: Mitsubishi Heavy Industries, Ltd., Tokyo (JP); The Society of Japanese Aerospace Companies, Tokyo (JP)

( * ) Notice: Subject to any disclaimer, the term of this patent is extended or adjusted under 35 U.S.C. 154(b) by 1050 days.

(21) Appl. No.: 10/912,565

(22) Filed: Aug. 6, 2004

(65) Prior Publication Data

US 2005/0047932 A1 Mar. 3, 2005

(30) Foreign Application Priority Data

Aug. 14, 2003 (JP) ............................. 2003-293490
Aug. 14, 2003 (JP) ............................. 2003-293523

(51) Int. Cl.
*F02C 1/00* (2006.01)
*F02G 3/00* (2006.01)
(52) U.S. Cl. ...................................................... 60/752
(58) Field of Classification Search .................. 60/752, 60/758, 760; 416/96 R; 165/80.3, 109.1, 165/181
See application file for complete search history.

(56) References Cited

U.S. PATENT DOCUMENTS

| 5,024,058 A * | 6/1991 | Shekleton et al. ............. 60/752 |
| 5,361,828 A | 11/1994 | Lee et al. |
| 5,695,320 A | 12/1997 | Kercher |
| 5,706,885 A * | 1/1998 | Kim ............................ 165/151 |
| 5,738,493 A | 4/1998 | Lee et al. |
| 6,578,627 B1 * | 6/2003 | Liu et al. ................. 165/109.1 |

FOREIGN PATENT DOCUMENTS

| EP | 1 077 311 | 2/2001 |
| EP | 1 098 141 | 5/2001 |

(Continued)

OTHER PUBLICATIONS

Japanese Office Action dated Jun. 1, 2007, issued in corresponding Japanese Application No. 2003-293490.

(Continued)

*Primary Examiner*—Michael Cuff
*Assistant Examiner*—Andrew Nguyen
(74) *Attorney, Agent, or Firm*—Westerman, Hattori, Daniels & Adrian, LLP

(57) ABSTRACT

A heat exchange wall include a base plate; a plurality of first protrusions distributedly provided on a surface of the base plate, and a plurality of second protrusions distributedly provided on the base plate surface. The height of the second protrusion in a normal direction of the base plate is desirably less than ½ of a height of the first protrusion in the normal direction. The height of the second protrusion in the normal direction is desirably between 1/20 and ¼ of the height of the first protrusion in the normal direction. More desirably, the height of the second protrusion in the normal direction is 1/10 of the height of the first protrusion in the normal direction.

5 Claims, 18 Drawing Sheets

FOREIGN PATENT DOCUMENTS

| | | |
|---|---|---|
| EP | 1 318 353 | 6/2003 |
| JP | 56-168038 | 12/1981 |
| JP | 61-187501 A | 8/1986 |
| JP | 10-82527 | 3/1998 |
| JP | 2000-88253 | 3/2000 |
| JP | 2002-129903 | 5/2002 |

OTHER PUBLICATIONS

The Society of Japanese Airospace Companies (SJAC) Progressive Aircraft Technology Development Center, "Investigation and study report on development of progressive aircraft technology" No. 1406, Mar. 31, 2003.

* cited by examiner

1c: HEAT EXCHANGE WALL

A-A'

1d; HEAT EXCHANGE WALL

A-A'

Fig. 9A
1e; HEAT EXCHANGE WALL
Fig. 9B
A-A'
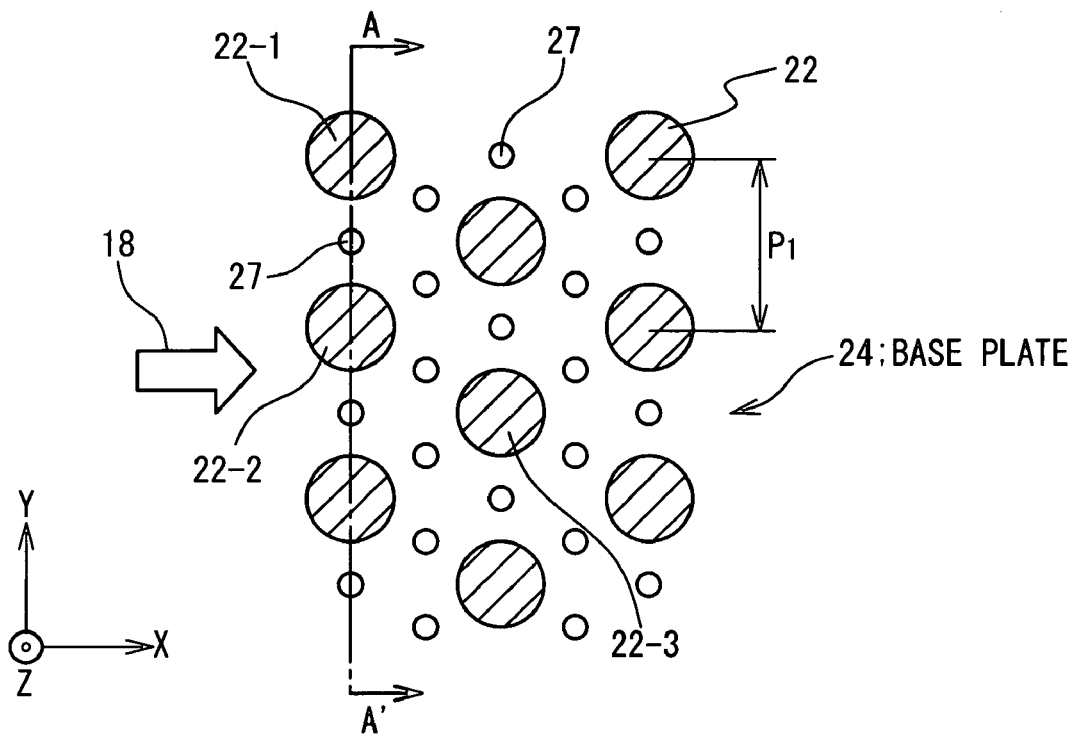
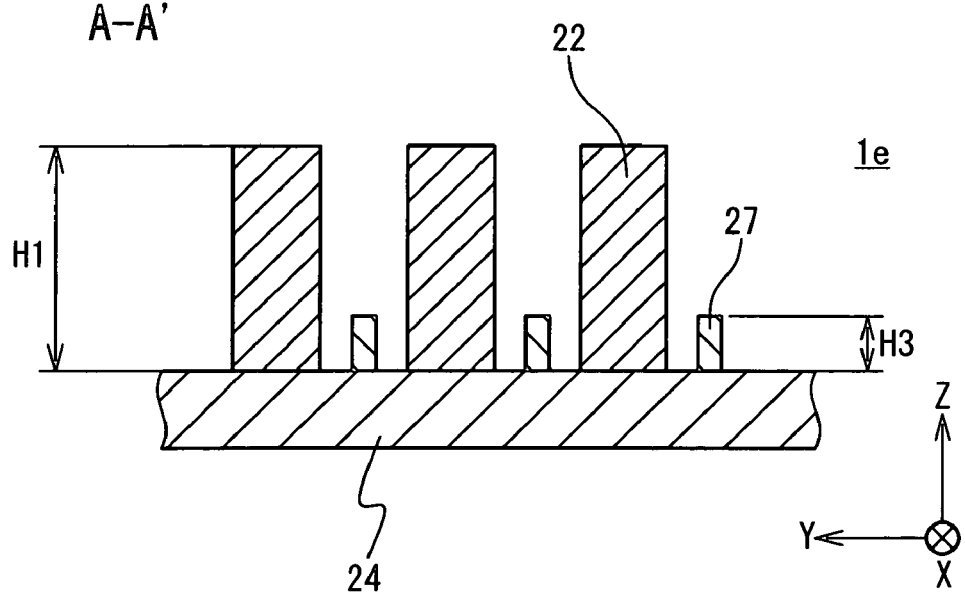

1f; HEAT EXCHANGE WALL

A-A'

STAGNATION

HEAT EXCHANGING WALL, GAS TURBINE USING THE SAME, AND FLYING BODY WITH GAS TURBINE ENGINE

BACKGROUND OF THE INVENTION

1. Field of the Invention

The present invention relates to a structure of a heat exchange wall, and more particularly relates to a structure of a heat exchange wall which is suitable for cooling a combustor of a gas turbine, and a flying body with a gas turbine engine in which provided with the heat exchange wall.

2. Description of the Related Art

A gas turbine contains a compressor for compressing air, a combustor for combusting fuel using the air compressed by the compressor and generating combustion gas of a high temperature, and a turbine for obtaining a driving force through the expansion of the combustion gas from the combustor. In order to improve a thermal efficiency of the gas turbine, a combustor has been developed for combusting the fuel at a higher temperature. Also, the temperature rise in the combustion gas leads to the increase in NOx generated in the combustor. In order to decrease the load on the environment exerted by the gas turbine, it is necessary to reduce an exhaust amount of NOx. Therefore, a cooling device with excellent cooling efficiency is desired to cool the combustor.

In the gas turbine in which the temperature of the combustion gas is higher, a turbine blade requires a higher heat resistance. In order that the turbine blade has the higher heat resistance, a cooling structure is known in which a flow path is formed inside the gas turbine blade to flow cooling medium such as air and the like, so that the gas turbine blade is cooled from inside.

A gas turbine is disclosed in Japanese Laid Open Patent Application (JP-P2000-88252A). In the gas turbine of this conventional example contains liners. A combustion chamber is formed in a space surrounded by the liners. The gas turbine of this conventional example contains an outer wall located on an outer circumferential side of the liners, and an air flow path, which is formed in a gap between the liner and the outer wall, to introduce the air compressed by a compressor into the combusting chamber. In the conventional gas turbine, a rib is formed on the outer circumferential surface of the liners as a convex portion extending in the circumference direction and fins are formed as convex portions extending in a longitudinal direction and having a height higher than the rib.

Also, another gas turbine combustor of a premixed lean combustion type is disclosed in Japanese Laid Open Patent Application (JP-A-Heisei 10-82527). The gas turbine combustor contains a cylindrical combustor liner, inside of which functions as a combusting chamber. A pilot fuel nozzle is provided at the upstream end of the combustor liner to supply fuel into the combusting chamber. A premixing duct is provided on the downstream side of the pilot fuel nozzle and connected to the circumferential wall of the combustor liner to supply the premixed fuel of fuel and air. A tail tube is connected to the downstream end of the combustor liner to introduce the combustion gas into the turbine side. The gas turbine combustor is further composed of an air flow path for introducing the fuel and air into the premixing duct. A fuel blowing portion of the pilot fuel nozzle is formed as an annular space, and a flow sleeve is provided on the outer circumferential side of the combustion liner. The fuel and air are sent from the downstream side of the combustor liner to the upstream side within the air flow path, so that the fuel and air are used as cooling air for the combustor liner. A rib-shaped fin is provided on the outer circumferential surface of the combustor liner facing the annular space as a turbulence generating device for the cooling air to cross a combustor liner axis direction.

In addition, a blade cooling structure for a gas turbine is disclosed in Japanese Laid Open Patent Application (JP-P2002-129903A). In the conventional blade cooling structure for the gas turbine, fuel is sprayed from a fuel nozzle within a combusting liner and is combusted in the gas turbine using compressed air supplied from a compressor. The combustion gas is introduced into a dynamic blade through a stator blade to obtain a power. A part of the compressed air is introduced as cooling air into the stator blade and/or the dynamic blade so as to cool the stator blade and/or the dynamic blade. It is supposed that a direction to connect a front edge and a rear edge is a blade width direction, a direction to connect a blade edge on an opposite axis center side and an axis center side edge perpendicularly to the blade width direction is a blade length direction, and a direction to connect a back side and a body side is a blade thickness direction. In this case, one or more thermal wall members are provided inside the blades to extend in the blade length direction and to connect back members and body members. A cooling air path is formed for the cooling air to be sent through it in the blade length direction. A plurality of protrusions protrude towards the center in the blade thickness direction from at least one of the inner surface of the back member and the inner surface of the body member and are arranged substantially parallel to and separated from each other in the blade length direction while being inclined and extended on the upstream side of the cooling air flow towards the orientations opposite to each other from both of the pair of separation wall members of the cooling air path. The protrusions have the two kinds of the long protrusion whose length in the blade width direction exceeds the half of the cooling air path and the short protrusion whose length of the blade width direction is less than the half of the cooling air path. The long protrusion is arranged on the side of one of the pair of the separation wall members, and the protrusion extending from the other side at the same blade length position is the short protrusion. The long and short protrusions on the sides of the respective separation wall members are alternately arranged in the blade length direction.

Also, a combustor liner for a gas turbine engine is disclosed in Japanese Laid Open Patent Application (JP-A-Showa 56-168038). In this conventional example, the combustor liner is composed of a cylindrical liner outer wall and segmented liner inner walls. The liner outer walls define a combustion zone. The liner inner walls are coaxially arranged apart from each other in an axis direction and define inner wall of the combustion zone. Also, a wall section contains protrusion toward the liner outer wall in a longitudinal direction to a position near to the liner outer wall. The wall section defines a longitudinal direction path having open ends together with the inside of the liner outer wall. The combustor liner is further composed of an inlet to introduce cooling air from the combustor to the longitudinal direction path such that a part of the cooling air flows in a direction opposite to a flow of combustion product and the other part of the cooling air flows in parallel to the flow of combustion product. The combustor liner is further composed of a supporting section to support the liner inner walls in a floating state such that the liner inner walls can move coaxially to the liner outer wall for suppressing thermal stress generated during the combustion to a minimum.

SUMMARY OF THE INVENTION

It is an object of the present invention to provide a heat exchange wall which is high in heat exchange efficiency.

Another object of the present invention is to provide a heat exchange wall which is high in heat exchange efficiency and cheap.

Still another object of the present invention is to provide a heat exchange wall that can cool a combustor of a gas turbine at a high efficiency.

Still another object of the present invention is to provide a gas turbine in which an exhaust amount of NOx (Nitrogen Oxides) is low.

In an aspect of the present invention, a heat exchange wall include a base plate; a plurality of first protrusions distributedly provided on a surface of the base plate; and a plurality of second protrusions distributedly provided on the base plate surface.

Here, the height of the second protrusion in a direction perpendicular to the base plate surface is desirably less than ½ of a height of the first protrusion in the perpendicular direction. The height of the second protrusion in the perpendicular direction is desirably between 1/20 and ¼ of the height of the first protrusion in the perpendicular direction. More desirably, the height of the second protrusion in the perpendicular direction is 1/10 of the height of the first protrusion in the perpendicular direction.

Also, the heat exchange wall may further include a plurality of third protrusions distributedly provided on the base plate surface. In this case, the height of the third protrusion in a direction perpendicular to the base plate surface may be less than ½ of a height of the first protrusion in the perpendicular direction. The height of the third protrusion in the perpendicular direction is desirably between 1/20 and ¼ of the height of the first protrusion in the perpendicular direction. More desirably, the height of the third protrusion in the perpendicular direction is 1/10 of the height of the first protrusion in the perpendicular direction.

Also, lines of the first protrusions may be periodically arranged in a first pitch in a first direction, the first protrusions in each of the lines may be periodically arranged in a second pitch in a second direction orthogonal to the first direction, adjacent two of the lines may be arranged to be shifted by a half of the second pitch. A cooling air flows in the first direction. In this case, lines of the second protrusions may be periodically arranged in the first pitch in the first direction, and each of the lines of the second protrusions may be arranged between adjacent two of the lines of the first protrusions. Also, at least one of the plurality of second protrusions may be provided for each of the plurality of first protrusions. In addition, one of the plurality of second protrusions may be arranged between adjacent two of the first protrusions of each of the lines.

Also, each of first lines contains the first protrusion and the second protrusion, and the first lines are periodically arranged in a first pitch in a first direction. The first protrusions in each of the first lines are periodically arranged in a second pitch in a second direction orthogonal to the first direction, and adjacent two of the first lines may be arranged to be shifted by a half of the second pitch. A cooling air flows in the first direction. In this case, second lines of the third protrusions may be periodically arranged in the first pitch in the first direction, and each of the second lines of the third protrusions may be arranged between adjacent two of the first lines. Moreover, at least one of the plurality of third protrusions may be provided in a front portion of the first protrusion or the second protrusion in each of the first lines. In addition, one of the plurality of third protrusions may be arranged between the first protrusion and the second protrusion of each of the first lines.

Also, a cross section of each of the plurality of first protrusions parallel to the base plate surface may be a circle, and a cross section of each of the plurality of second protrusions parallel to the base plate surface may be a circle. Instead, a cross section of each of the plurality of first protrusions parallel to the base plate surface may be a circle, and a cross section of each of the plurality of second protrusions parallel to the base plate surface may be a rectangle. In this case, one side of the rectangle is desirably diagonal to the first direction.

Also, a cross section of each of the plurality of first protrusions parallel to the base plate surface may be a circle, a cross section of each of the plurality of second protrusions parallel to the base plate surface may be a circle, and a cross section of each of the plurality of third protrusions parallel to the base plate surface may be a circle. Instead, a cross section of each of the plurality of first protrusions parallel to the base plate surface may be a circle, a cross section of each of the plurality of second protrusions parallel to the base plate surface may be a rectangle, and a cross section of each of the plurality of third protrusions parallel to the base plate surface may be a rectangle. In this case, one side of the rectangle is desirably diagonal to the first direction.

In another aspect of the present invention, a gas turbine includes an outer wall liner in which a combustion chamber is formed; and a heat exchange wall provided inside the outer wall liner. A cooling medium flows through a space between the outer wall liner and the heat exchange wall. The heat exchange wall includes a base plate; a plurality of first protrusions distributedly provided on a surface of the base plate; and a plurality of second protrusions distributedly provided on the base plate surface.

In another aspect of the present invention, a gas turbine includes a flying body, wherein when the flying body flies, at least a part of a surface of the flying body is exposed to an atmospheric flow having substantially a same velocity as a flight velocity of the flying body. A heat exchange wall is provided on the at least a part of a surface. The heat exchange wall includes a base plate; a plurality of first protrusions distributedly provided on a surface of the base plate; and a plurality of second protrusions distributedly provided on the base plate surface.

BRIEF DESCRIPTION OF THE DRAWINGS

FIGS. 9A and 9B are a plan view and a sectional view showing the heat exchange wall according to a fifth embodiment of the present invention;

DESCRIPTION OF THE PREFERRED EMBODIMENTS

Hereinafter, a heat exchange wall of the present invention will be described in detail with reference to the attached drawings. The heat exchange wall of the present invention can be preferably used to cool a combustion liner of a combustor of a gas turbine engine of an airplane.

Figure 1:
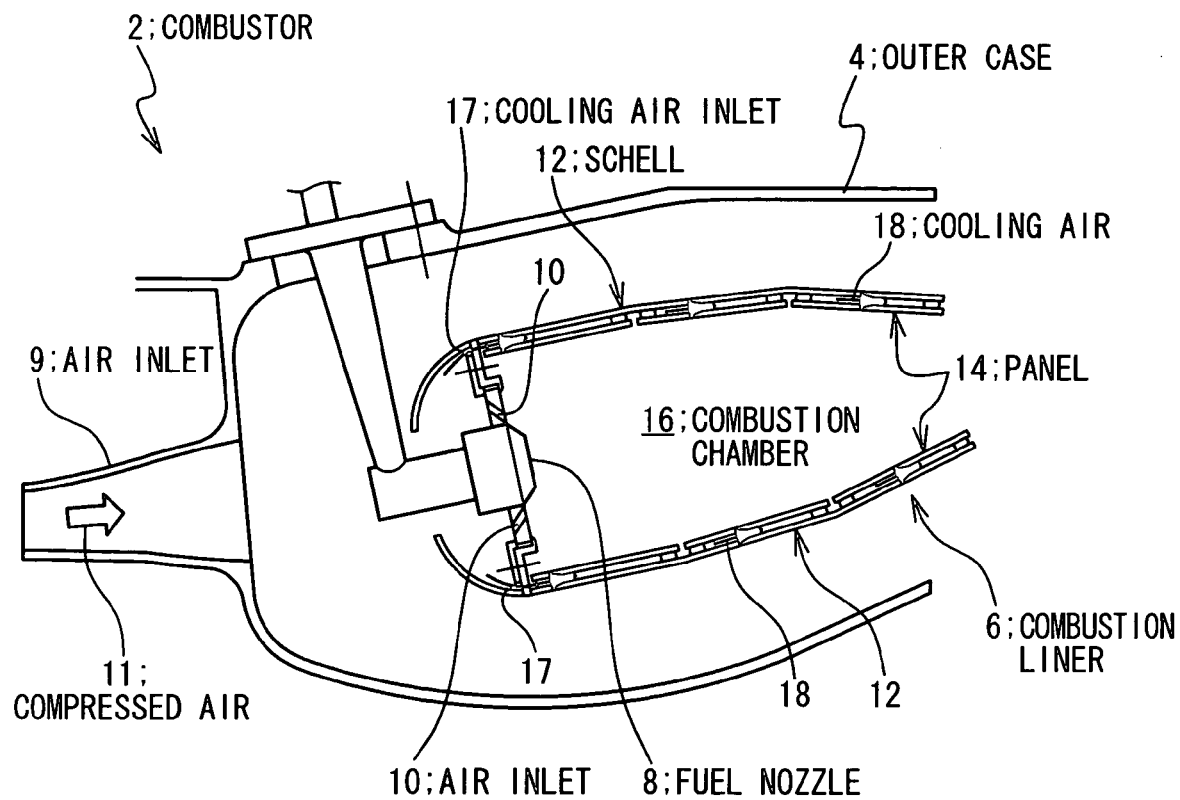
FIG. 1 is a block diagram showing the structure of a combustor of a gas turbine.

Referring to FIG. 1, a combustor 2 of a gas turbine has an outer case 4 and a combustion liner 6. The outer case 4 contains an air inlet 9 for inputting air 11 compressed by a compressor (not shown). The outer wall of the combustion liner 6 is constituted of a shell 12. The inside of the shell 12 is covered with a plurality of panels 14. The panels 14 are provided for the shell 12 to have a gap from the shell 12. The gap is connected to a cooling air inlet 17 and a part of the compressed air 11 flows through the gap. The space surrounded by the panels 14 is a combusting chamber 16. A fuel nozzle 8 is provided in the combusting chamber 16 to spray fuel into the combusting chamber 16, and an air inlet 10 is formed to introduce most of the compressed air 11 into the combusting chamber 16. Thus, the fuel and air are mixed and combusted. The downstream side of the combusting chamber 16 is connected to the inlet of the turbine. The panel 14 is constituted of a heat exchange wall.

Figure 2A:
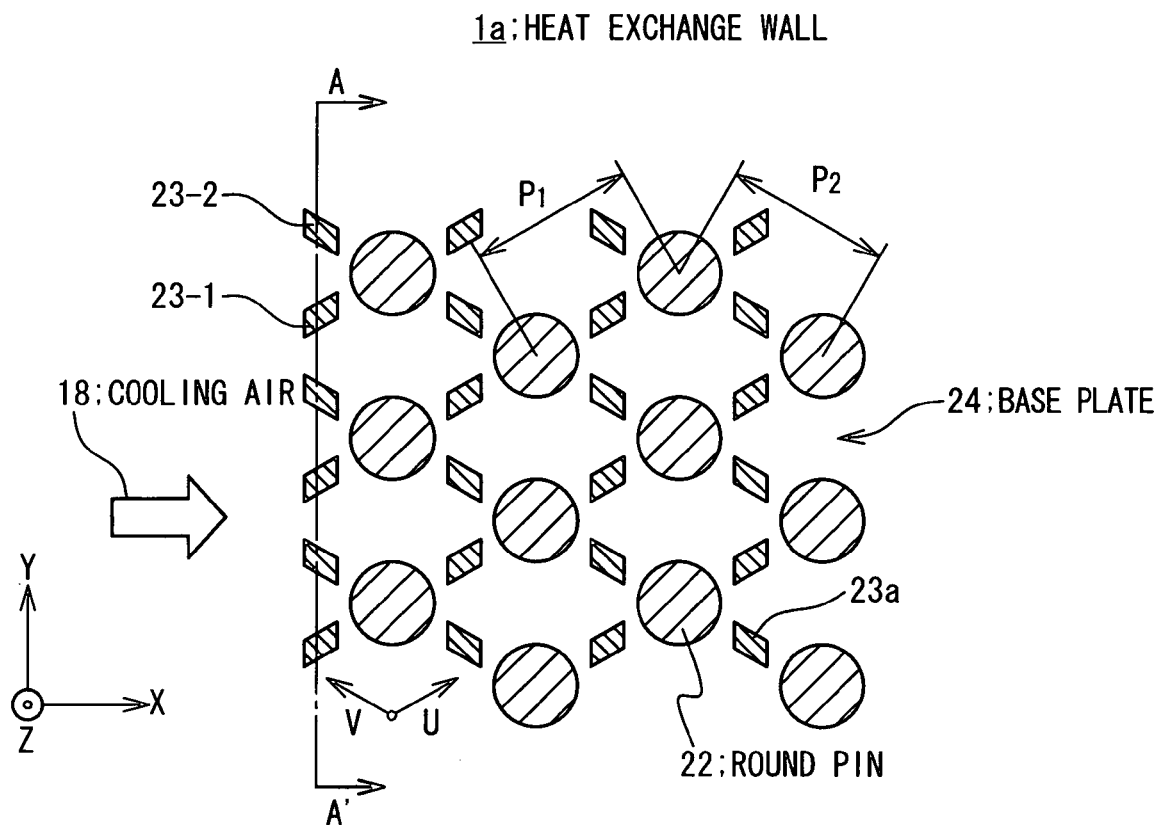
FIGS. 2A and 2B are a plan view and a sectional view showing a heat exchange wall according to a first embodiment of the present invention.
Figure 2B:
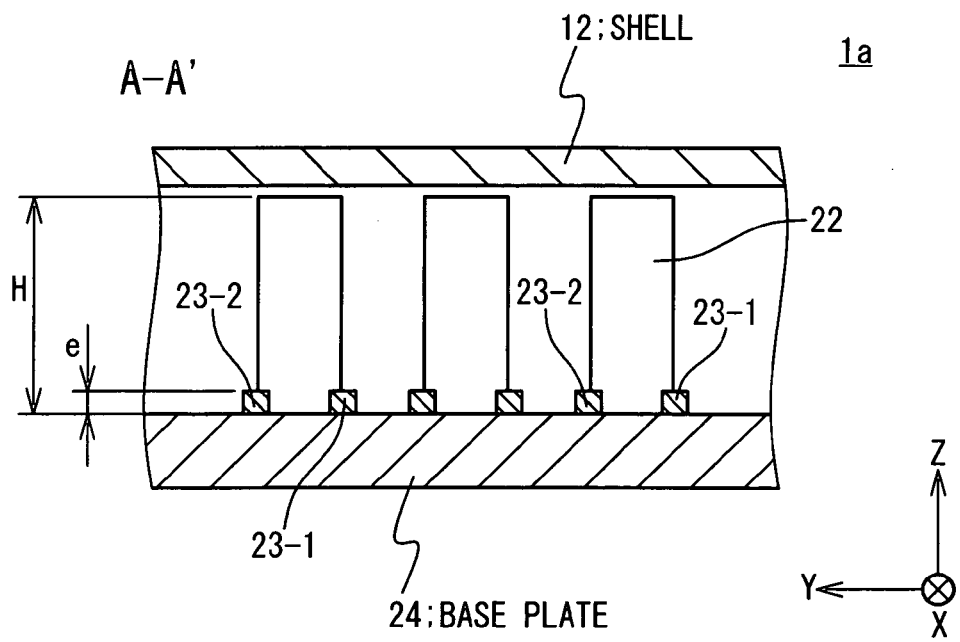

FIGS. 2A and 2B are a plan view and a cross sectional view showing a heat exchange wall 1a according to the first embodiment of the present invention. The cooling air inlet 17 is provided on the upstream side of the heat exchange wall 1a in an X-axis direction. That is, cooling air 18 flows almost in the X-axis direction. A plurality of round pins or fin 22 are provided on a base plate 24 to extend into the Z-axis direction. The plurality of round pins 22 have a same cylindrical shape. The plurality of round pins 22 are periodically arranged in a pitch $P_1$ in the direction of a first coordinate axis U parallel to the base plate 24, and are periodically arranged in a pitch $P_2$ in the direction of a second coordinate axis V parallel to the base plate 24, and intersecting with the first coordinate axis U. It is desirable that the heat exchange wall 1a is mounted to the shell 12 such that a bisector of the first coordinate axis U and the second coordinate axis V is orthogonal to an average direction of the flow of the cooling air 18.

Also, a plurality of ribs 23a (23-1 and 23-2) are provided on the base plate 24. The first rib 23-1 is provided on the base plate 24 on a middle position between adjacent two of the round pins 22 in the first coordinate axis U. A cross section of the first rib 23-1 parallel to the surface of the base plate 24 is a parallelogram having long sides parallel to the first coordinate axis U and short sides parallel to the Y-axis direction, i.e., the bisector of the first coordinate axis U and the second coordinate axis V. The second rib 23-2 is provided on the base plate 24 on a middle position between adjacent two of the round pins 22 in the second coordinate axis V. A cross section of the second rib 23-2 parallel to the surface of the base plate 24 is a parallelogram having long sides parallel to the second coordinate axis V and short sides parallel to the Y-axis direction, i.e., the bisector of the first coordinate axis U and the second coordinate axis V.

FIG. 2B is the sectional view of the heat exchange wall 1a along the A-A' line in shown in FIG. 2A. The base plate 24 faces the combusting chamber 16 on the side opposite to the side on which the round pins 22 are arranged. The height H1 of the round pin 22 in the Z-axis direction perpendicular to the base plate 24 surface is equal to or slightly shorter than the distance between the shell 12 and the surface of the base plate 24.

Figure 3:
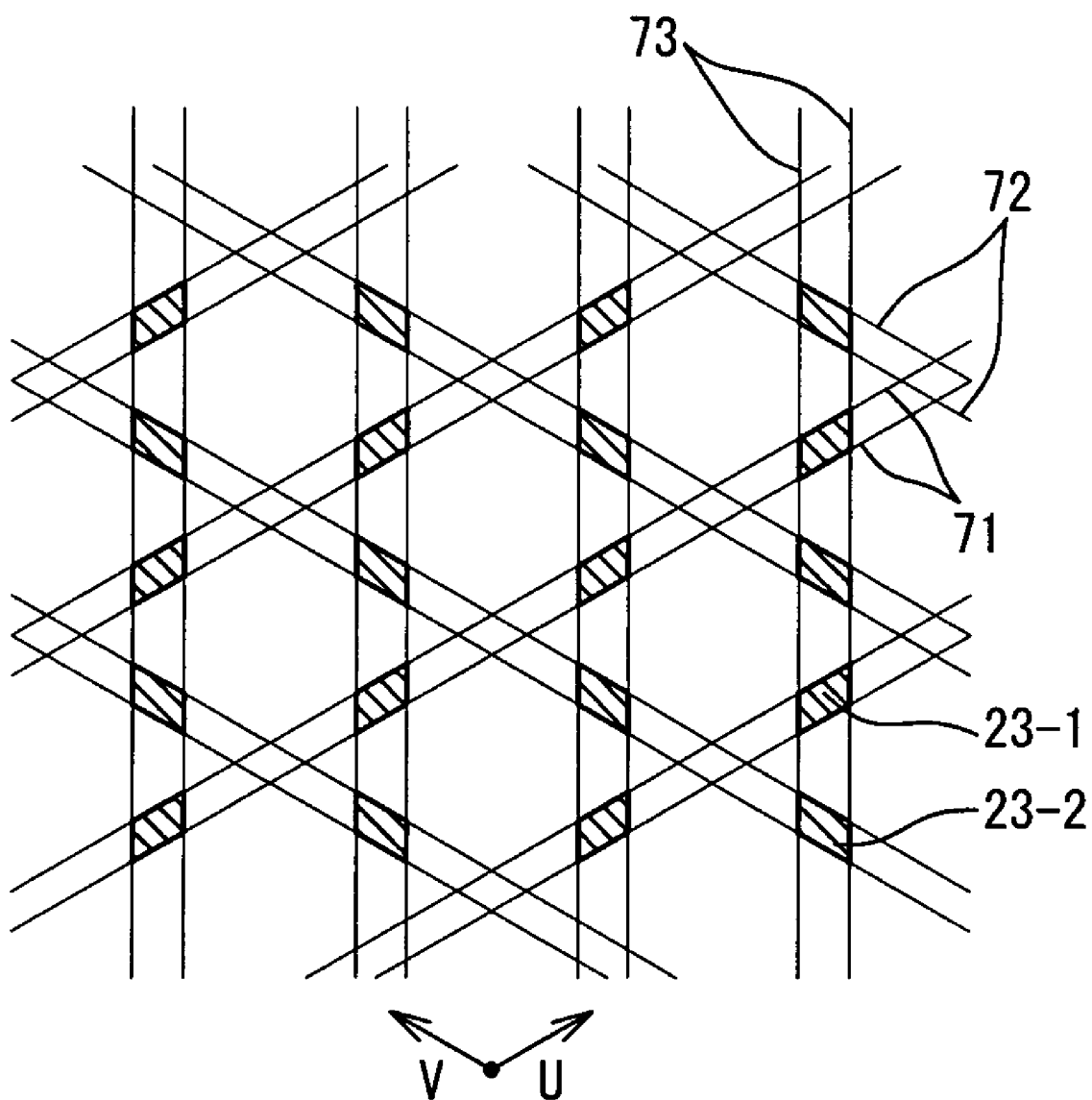
FIG. 3 is a diagram showing the sectional shapes of ribs in a horizontal plane direction.

FIG. 3 is a diagram showing the sectional shapes of the ribs 23a (23-1, 23-2). Each of the long sides of the sectional shapes of the first ribs 23-1 is a part of any of a plurality of first cutting lines 71 parallel to a first coordinate axis U. Each of the long sides of the sectional shapes of the second ribs 23-2 is a part of any of a plurality of second cutting lines 72 parallel to a second coordinate axis V. Each of the short sides of the sectional shapes of the first and second ribs 23-1 and 23-2 is a part of any of a plurality of third cutting lines 73 crossing the first coordinate axis U and the second coordinate axis V at an equal angle.

In the heat exchange wall 1a having the ribs of such a shape, a test sample to be used in a performance test for design is manufactured as follows. That is, at first, milling cutting is carried out on the base plate 24 to cut out the first rib 23-1 and the second rib 23-2. Next, the round pins 22 are attached to the base plate 24 through a method such as soldering and the like.

Since the first rib 23-1 and the second rib 23-2 are arranged as shown in FIG. 3, the milling cutting may be carried out along the first cutting lines 71, the second cutting lines 72 and the third cutting lines 73. It is easy to manufacture the test sample having the thus-arranged ribs. For this reason, it is easy to carry out the test so as to optimize the design of the heat exchange wall 1a used for the gas turbine.

When the gas turbine having the combustor 2 is operated, fuel is supplied from the fuel nozzle 8 into the combusting chamber 16, and the compressed air 11 is supplied from the air inlet 10. The fuel and the compressed air 11 are mixed inside the combusting chamber 16, and ignited by an igniter (not shown) and combusted. The compressed air 11 is also sent from the cooling air inlet 17 into the gap between the shell 12 and the panels 14 and flows through the gap as the cooling air 18.

A part of the heat generated by the combustion in the combusting chamber 16 is transferred to the base plate 24. A part of the heat transferred to the base plate 24 is transferred to the round pins 22. The cooling air 18 flows into the gap between the shell 12 and the base plate 24, and takes out the heat from the round pins 22 and the surface 24 of the base plate 24 on the side of the round pins 22.

The ribs 23a hinder the flow of the cooling air 18 and generate turbulence. Due to the generation of the turbulence, the cooling air 18 can efficiently take out the heat from the round pin 22 and the surface of the base plate 24.

Such a heat exchange wall 1a suppresses the temperature rise in the panel 14 having the structure of the heat exchange wall 1a and effectively suppresses the heat from being transferred from the combusting chamber 16 to the shell 12. This improves the durability of the panel 14 and the shell 12.

Figure 4A:
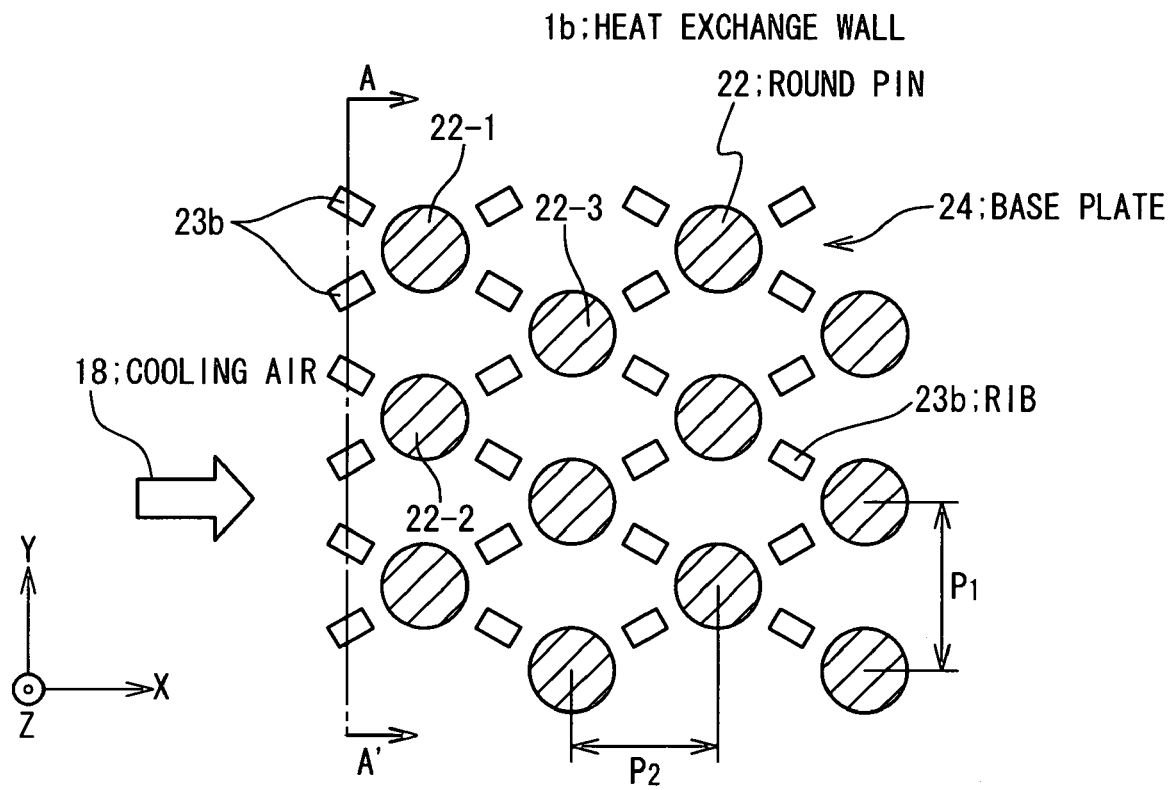
FIGS. 4A and 4B are a plan view and a sectional view showing the heat exchange wall according to a second embodiment of the present invention.
Figure 4B:
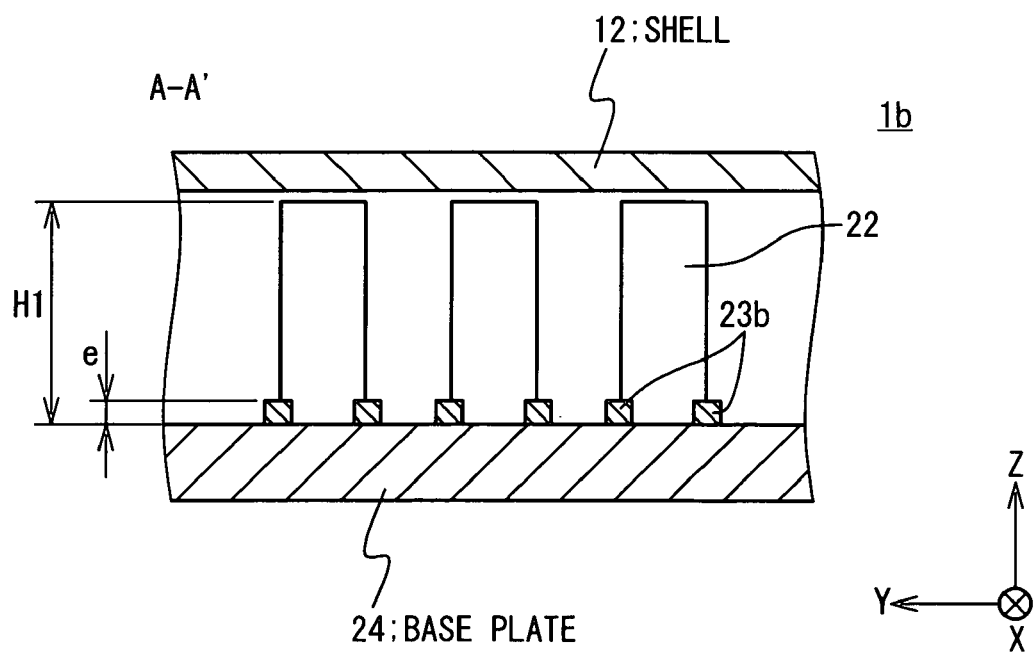

Next, FIGS. 4A and 4B are a plan view and a cross sectional view showing the heat exchange wall 1b according to the second embodiment of the present invention. The plurality of round pins or fins 22 are provided on the base plate 24. The plurality of pins 22 in the second embodiment have the same cylindrical shape as in the first embodiment. With regard to the shape of the pin 22, the shape of the section parallel to the base plate 24 may be elliptic. If the heat exchange wall 1b is manufactured by a casting method, the pin 22 may be formed to have a tapered shape in which the section area becomes larger in a position closer to the base plate 24.

In the second embodiment, the pins 22 are periodically arranged in a pitch $P_1$ in the Y-axis direction, and lines of the pins 22 are arranged in a pitch $P_2$ periodically in the X-axis direction. It is supposed that the two of the pins 22 adjacent in the Y-axis direction in one line are a pin 22-1 and a pin 22-2. In this case, one 22-3 of the pins 22 in one line adjacent to the line containing the pin 22-1 and the pin 22-2 is arranged on an intermediate position in the Y-axis direction between the pin 22-1 and the pin 22-2. That is, the line containing the pin 22-3 is parallel to the line containing the pins 22-1 and 22-2 in the Y-axis direction and is shifted from the line containing the pins 22-1 and 22-2 by a half pitch $P_1/2$ in the Y-axis direction.

The pin 22 exhibits the further effective cooling performance, under the heat transfer condition that the Biot number (=((Heat Transfer Coefficient*Representative Length)/Thermal Conductivity), where the representative length is a diameter of the pin 22) is greater than 0.4. It should be noted that when the heat transfer coefficient is represented by an SI unit, its dimension is $W*m^{-2}*K^{-1}$, and the thermal conductivity is similarly $W*m^{-1}*K^{-1}$.

A rib 23b is arranged between the pins 22 and each of the pins 22 is surrounded by the four ribs 23b. The cross section of the rib 23b parallel to the surface of the base plate 24 is rectangular and has the long sides of the rectangle parallel to a direction of arrangement of the two pins 22 adjacent to the rib 23b, and the short sides are orthogonal to the long sides. The length of the section of the rib 23b in the longitudinal direction parallel to the base plate is shorter than the distance between the two pins 22 adjacent to each other. That is, there is a gap between the rib 23b and the pin 22, and the gap is almost uniform.

FIG. 4B is the sectional view showing the heat exchange wall 1b along the A-A' line shown in FIG. 4A. The base plate 24 faces the combusting chamber 16 on the side opposite to the side on which the pins 22 are arranged. The height H1 of the pin 22 in the Z-axis direction perpendicular to the base plate 24 is equal to or slightly shorter than the distance between the shell 12 and the surface of the base plate 24. The rib 23b may be formed to have a tapered shape in which the sectional area becomes wider on a position closer to the surface of the base plate 24. The shape of the cross section of the rib 23b parallel to the base plate 24 may be a polygon such as a triangle, a pentagon and a more.

The height H1 of the pin 22 is about 3 mm. The height e of the rib 23b in the direction perpendicular to the base plate 24 is equal to or less than a half of the height H1 of the pin 22. Preferably, the height e of the rib 23b is between 1/20 and 1/4 of the height H1. Further preferably, the height e of the rib 23b is 1/10 of the height H1.

When the gas turbine having the combustor 2 is operated, the fuel is supplied from the fuel nozzle 8 to the combusting chamber 16, and the compressed air 11 is supplied from the air inlet 10. The fuel and the compressed air 11 are mixed inside the combusting chamber 16, and ignited by an igniter (not shown) and combusted. The compressed air 11 is sent from the cooling air inlet 17 to the gap between the shell 12 and the panel 14 and flows through the gap as the cooling air 18. Or, the compressed air 11 may be sent from cooling holes opened in the shell 12 into the gap between the shell 12 and the panel 14, and flows through the gap as the cooling air 18.

Figure 5:
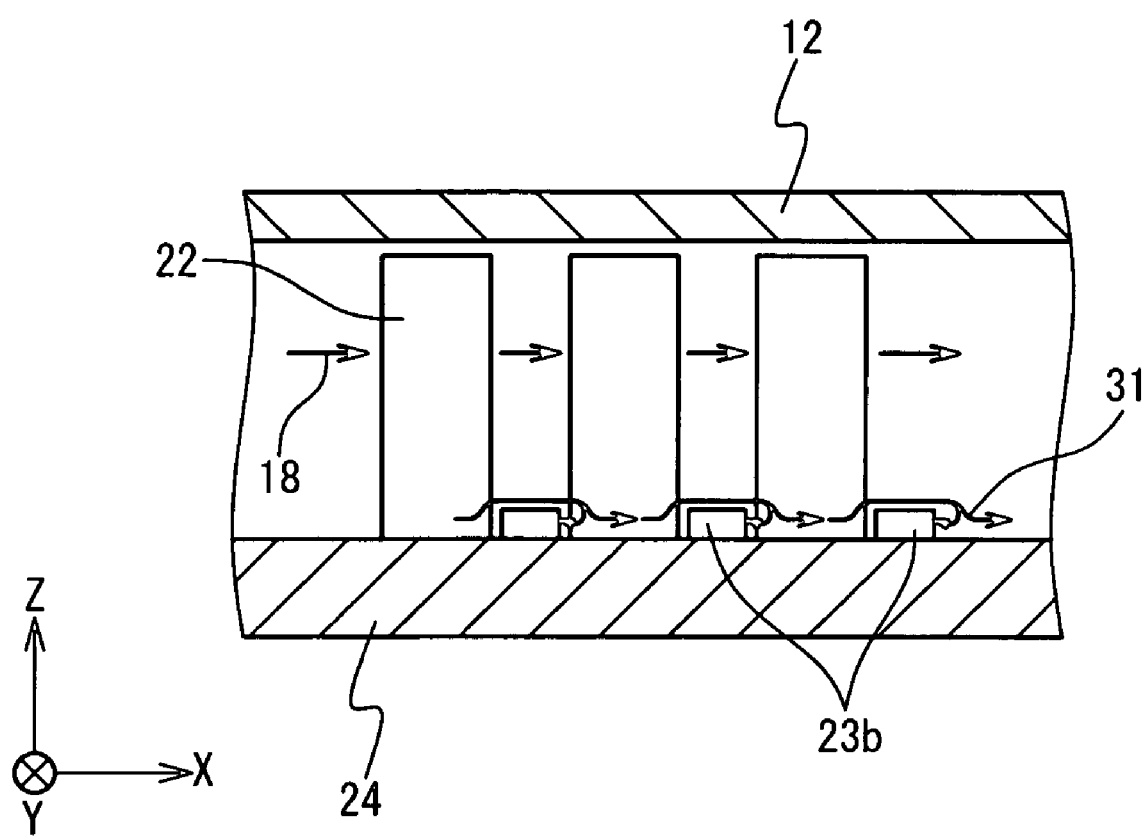
FIG. 5 is a diagram showing a cooling process.

Referring to FIG. 5, a part of the heat generated by the combustion in the combusting chamber 16 is transferred to the base plate 24. A part of the heat transferred to the base plate 24 is transferred to the pins 22. The cooling air 18 flows through the gap between the shell 12 and the base plate 24. The cooling air 18 takes out the heat from the surface of the base plate 24 and the pins 22. The temperature in a base portion of the pin 22 close to the base plate 24 is high due to the heat transfer from the base plate 24. The temperature in the tip portion of the pin 22 away from the base plate 24 is low since the heat is taken away by the cooling air 18. A temperature difference ΔT between the base portion and tip portion in the pin 22 is greater when the Biot number determined based on the thermal conductivity of the material of the pin 22 and the heat transfer coefficient on the surface of the pin 22 are greater. In case that the Biot number is greater, the temperature difference ΔT is greater than a case that the Biot number is smaller. In this way, in the pin 22 having the great temperature difference ΔT, the temperature difference between the cooling air 18 and the pin 22 is great in the vicinity of the base portion of the pin 22. Thus, the cooling air 18 can take away the heat more efficiently from the base portion than the tip portion of the pin 22.

The rib 23b hinders the flow of the cooling air 18 and generates turbulence 31 (31a and 31b) in the vicinity of the base portion of the pin 22. Due to the generation of the turbulence 31, the cooling air 18 more efficiently takes away the heat from the base portion of the pin 22 and the surface of the base plate 24.

Figure 6:
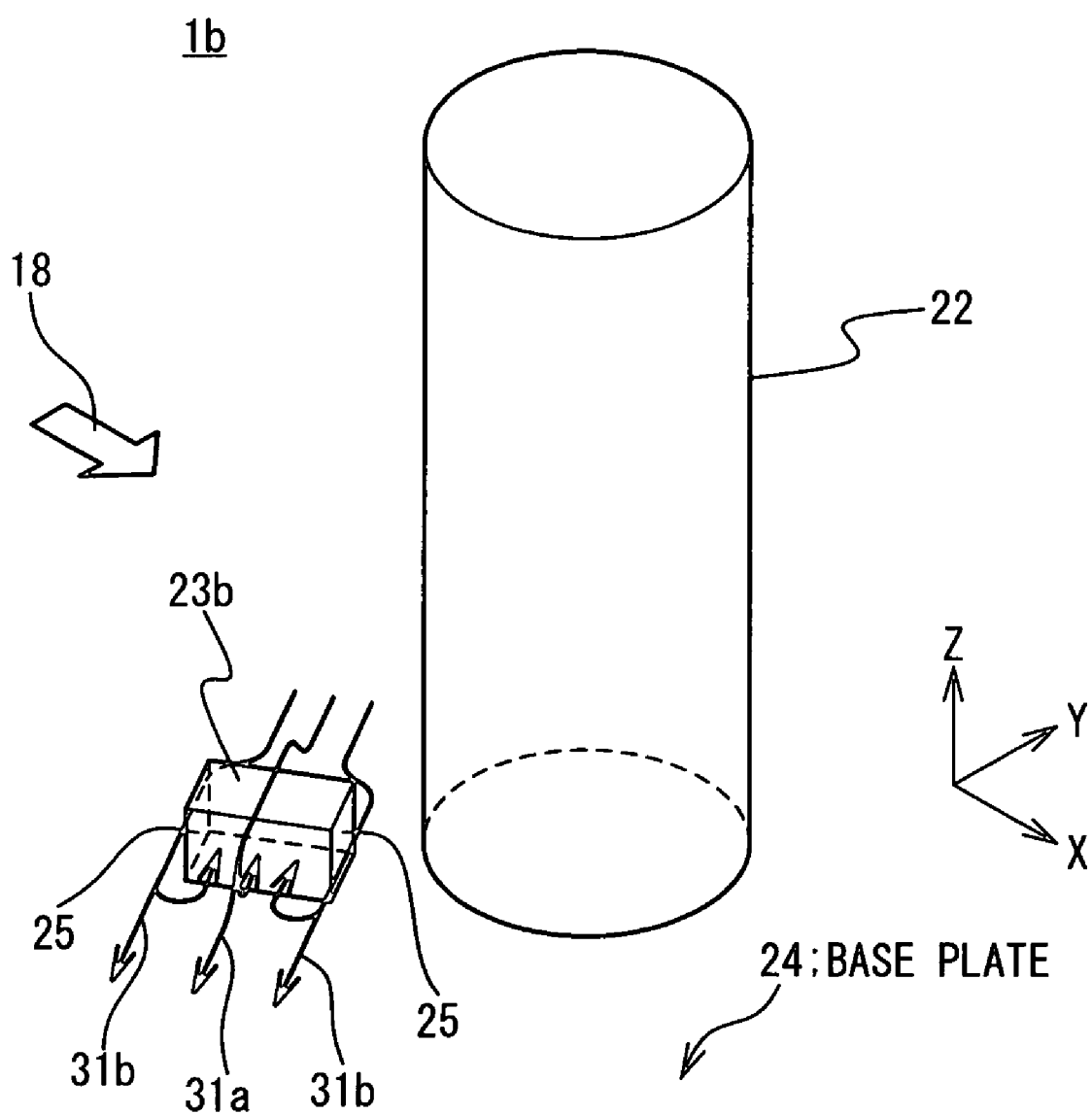
FIG. 6 is a diagram showing a process of generating turbulence.

Referring to FIG. 6, when the cooling air 18 passes around the top end of the rib 23b, a turbulence 31a is generated. When the cooling air 18 passes around the side planes 25 of the rib 23b opposite to the pin 22, the turbulences 31b are generated. When there are many end portions (the top end and the side planes 25) in the rib 23b, especially the number of the end portions per unit area of the base plate 24 is at least equal to the number of the pins 22 per unit area of the base plate 24, a large amount of the turbulences 31 are generated due to the end portions, and the base portion of each pin 22 and the surface of the base plate 24 can be efficiently cooled.

The height e of the rib 23b is desired to be equal to or less than 1/4 of the height H1 of the pin 22, in order to efficiently cool the vicinity of the base portion of the pin 22 or to reduce the pressure loss of the cooling air 18. In order that the turbulences 31 are effectively generated by the ribs 23b, the height e of the rib 23b is desired to be equal to or higher than 1/20 of the height H1 of the pin 22. Preferably, the height e of the rib 23b satisfies both of the above conditions. Further preferably, the height e of the rib 23b is 1/10 of the height H1 of the pin 22.

Figure 12A:
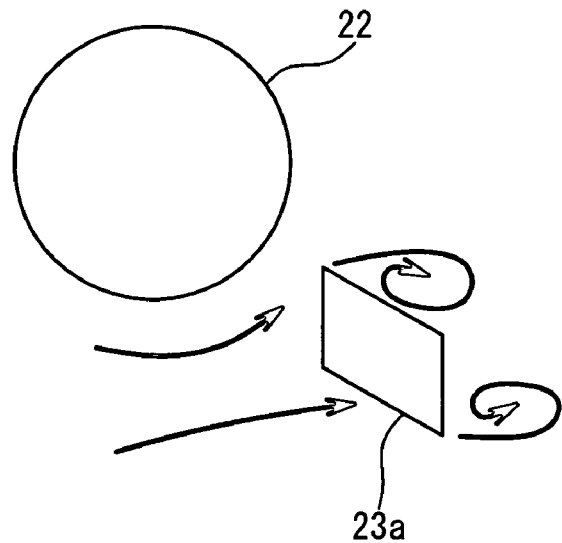
FIGS. 12A to 12D are diagrams showing turbulences generated in the first and second embodiments.
Figure 12B:
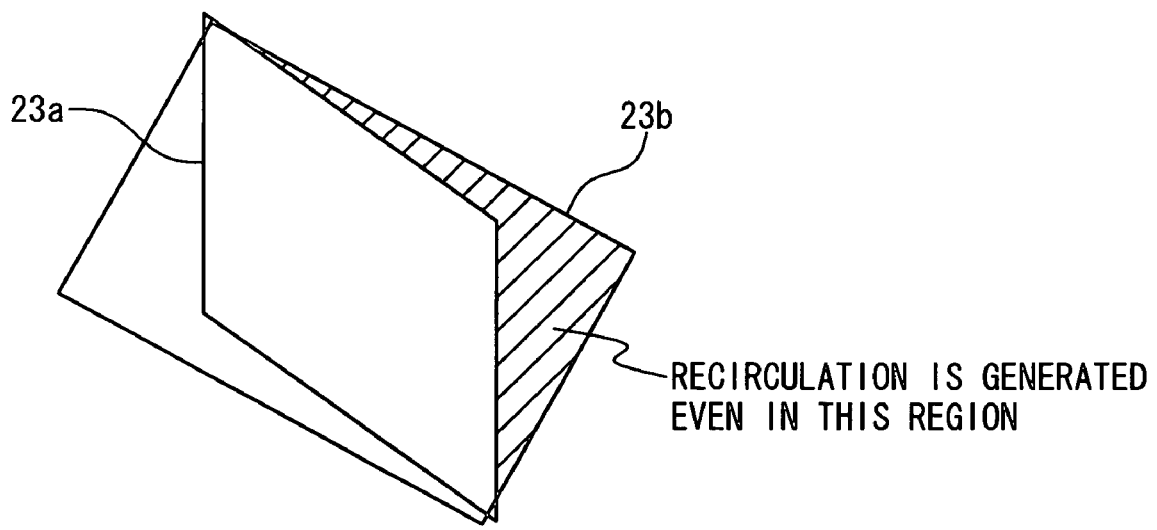
Figure 12C:
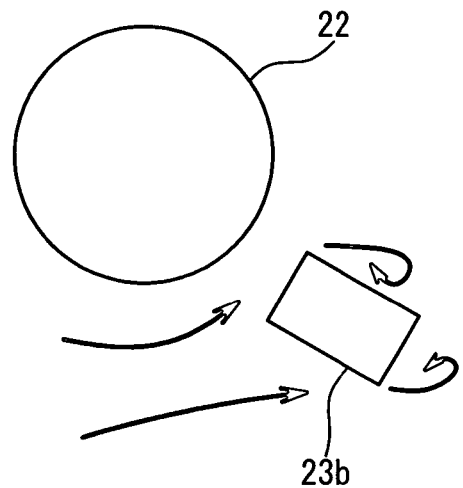

As shown in FIGS. 12A and 12B, in the first embodiment, there is a case that the cooling air flow separates largely from the acute angle portions of the parallelogram of the rib 23a.

For this reason, a recirculation which forms a low heat transfer coefficient region is produced on the downstream side of the rib 23a, as shown in FIG. 12B. This is called a lateral air eddy or the recirculation having an axis perpendicular to the base plate surface, and causes pressure loss without promoting heat exchange. In the first embodiment, the lateral air eddy (recirculation) is large as shown in FIGS. 12A to 12D. Therefore, the heat transfer coefficient decreases and the pressure loss increases, in accordance with the size of the recirculation region. Thus, the effect of the ribs is limited.

Figure 12D:
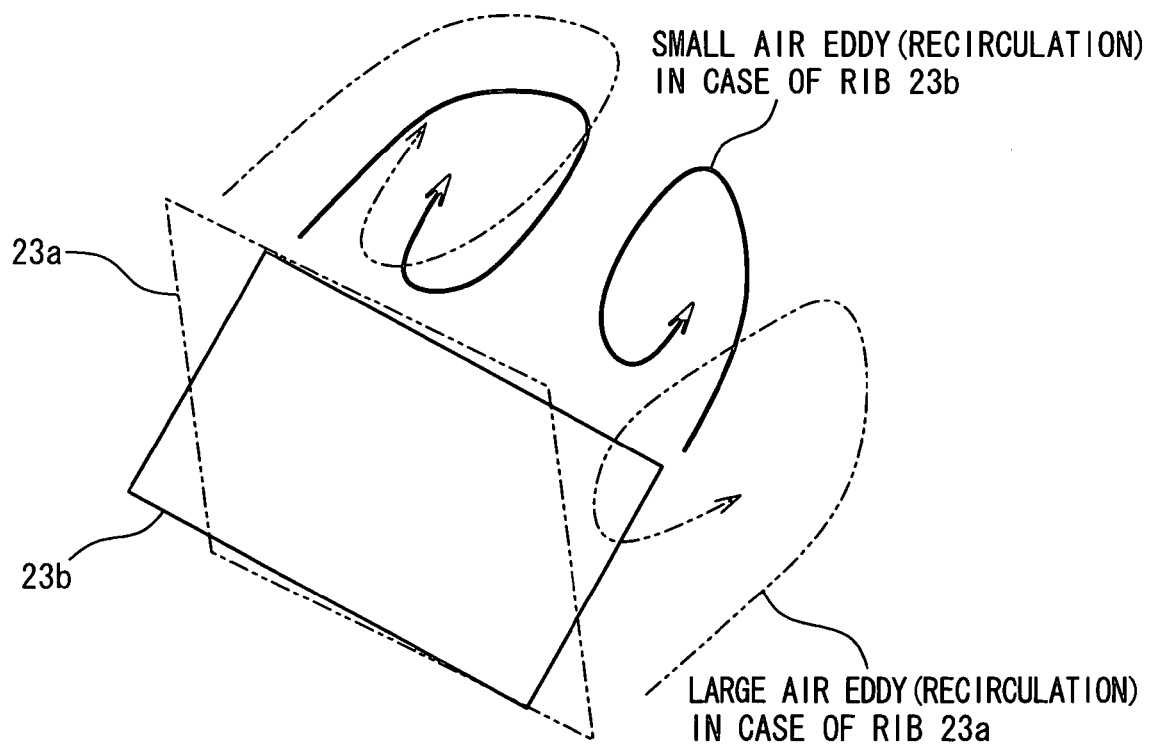

On the other hand, in case of rectangular rib or protrusion 23b, it is possible to reduce the recirculation region, as shown in FIG. 12D. As a result, the heat exchange is promoted and the pressure loss can be reduced.

Figure 13A:
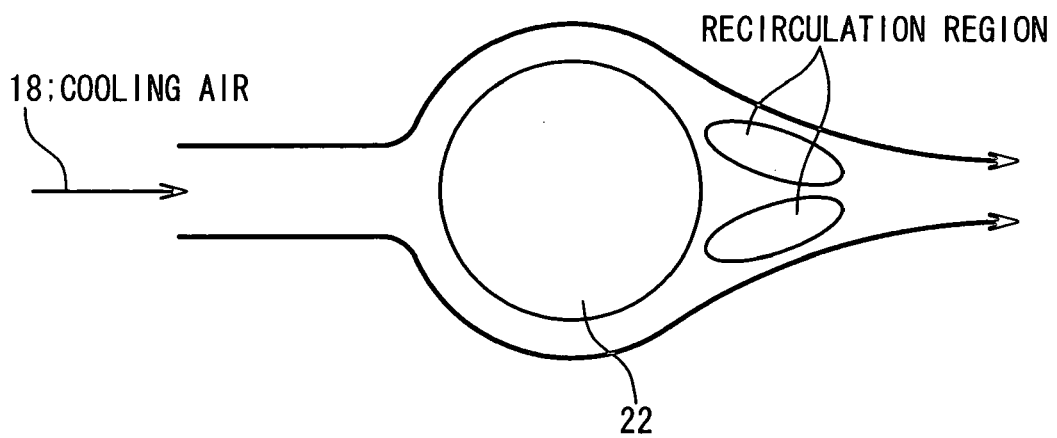
FIGS. 13A and 13B are diagrams showing the cooling air flows with recirculation and no recirculation.
Figure 13B:
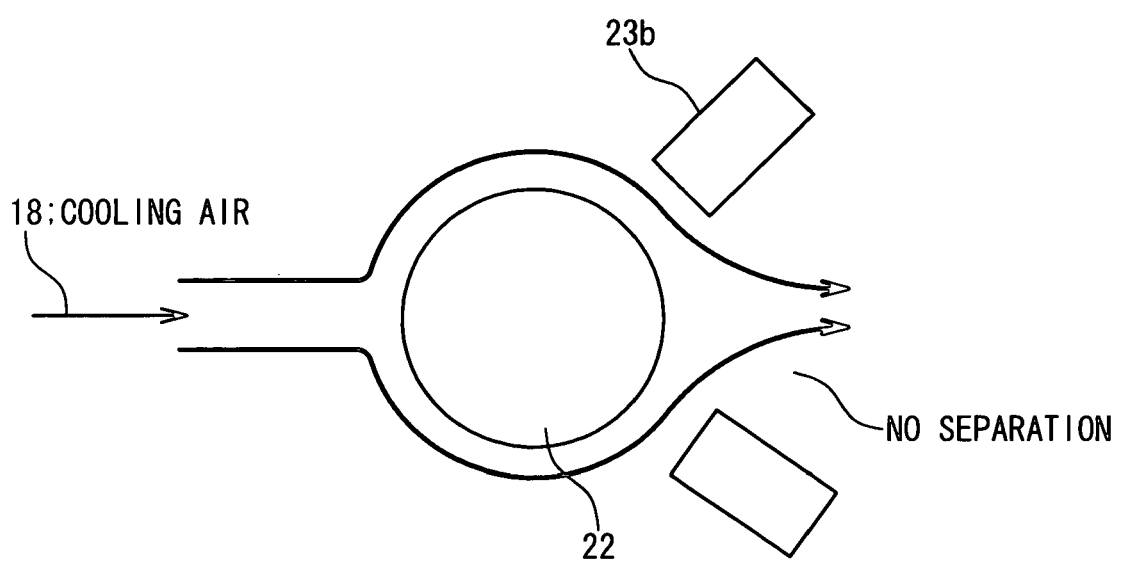

Also, behind the round pins 22, the cooling air flow may separate and produce recirculation regions as a low heat transfer coefficient region and additional pressure loss as shown in FIG. 13A. In this case, in the rectangular rib or protrusion 23b, a side plane of the rectangular rib 23b opposing to the round pin 22 is almost parallel to an arc of the circle of the round pin 22, as shown in FIG. 13B. Therefore, the width of the cooling air flow path is almost constant so that the cooling air flow speed can be held constant. Thus, it is possible to prevent the separation and recirculation of the cooling air flow from being produced on the downstream side of the round pin 22. That is, the rectangular rib or protrusion 23b can effectively increase heat exchange and decrease pressure loss.

Further, when the heat exchange wall 1b with the rectangular ribs 23b is manufactured by a casting method, the rectangular rib 23b can be easily formed with a high production yield, compared with the heat exchange wall 1a with the parallelogram ribs 23a.

Through use of the above-mentioned heat exchange wall 1a or 1b, the decrease in the temperature of the heat exchange wall 1a or 1b itself can be achieved, and the heat transferred from the combusting chamber 16 to the shell 12 is effectively suppressed. According to the combustor 2 having the heat exchange wall 1a or 1b, even if the shell 12 and the heat exchange wall 1a or 1b are made of the material having the same heat resistance as that of the conventional technique, the combustion temperature of the combusting chamber 16 can be made higher. The gas turbine having the above-mentioned heat exchange wall 1a or 1b has the high thermal efficiency.

The cooling efficiency equal to or higher than a heat exchange wall which has the pins 22 on the base plate 24 and does not have the ribs 23 can be achieved in the above-mentioned heat exchange wall 1a or 1b which has the smaller number of the pins 22 per unit area. For this reason, according to the heat exchange wall of the present invention, the pressure loss in the heat exchange wall 1a or 1b is smaller than the heat exchange wall in which no rib 23 is contained, in order to attain the same cooling efficiency. Moreover, since the number of the pins 22 is small, the manufacturing becomes easy and the yield is improved. Consequently, the manufacturing cost is decreased.

According to the combustor 2 having the above-mentioned heat exchange wall 1a or 1b, the efficiency of the heat exchange is excellent. Thus, an amount of the cooling air 18 required to exchange the same caloric is small as compared with the conventional technique. For this reason, a larger amount of the compressed air can be introduced into the combusting chamber 16, if the flow rate of the compressed air 11 is same as the conventional technique. Since the flow rate of the compressed air is increased with respect to the flow rate of the fuel in the combusting chamber 16, the NOx concentration of the exhaust gas exhausted from the combustor 2 can be reduced.

The gas turbine having such a heat exchange wall 1a or 1b is preferably used for an engine of an airplane. In particular, it is preferably used for the engine of the airplane for a super high speed. In the airplane having such an engine, the exhaust amount of the NOx is small. The combustor having the above-mentioned heat exchange wall 1a or 1b is preferably used in the engine of a flying body that can fly outside the troposphere.

Figure 7A:
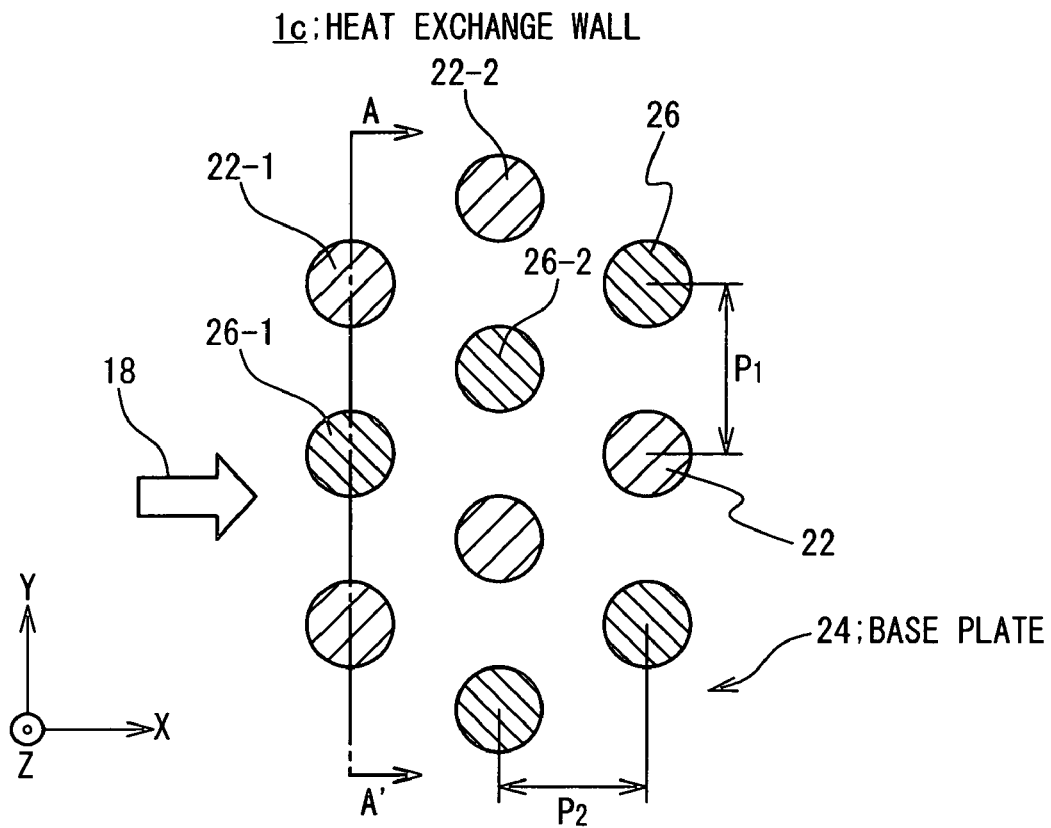
FIGS. 7A and 7B are a plan view and a sectional view showing the heat exchange wall according to a third embodiment of the present invention.
Figure 7B:
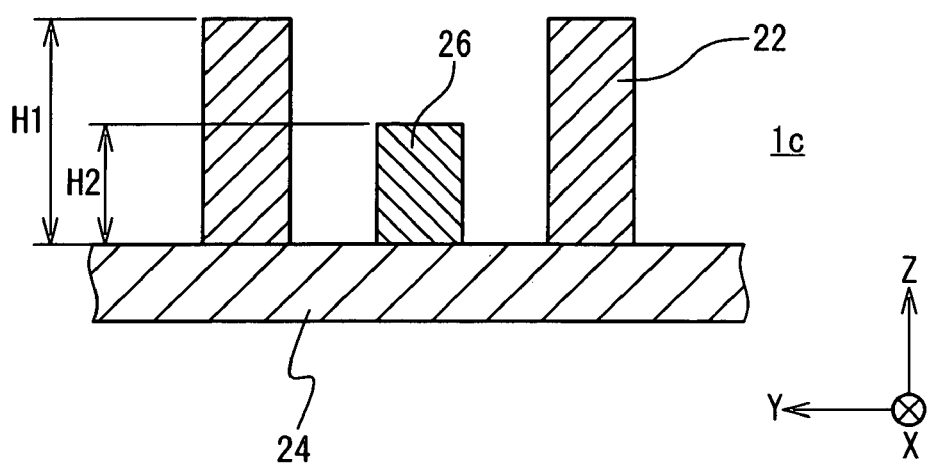

Next, FIGS. 7A and 7B are plan view and a cross sectional view showing the structure of the heat exchange wall 1c according to the third embodiment of the present invention. Referring to FIG. 7A, the cooling air is supplied to the heat exchange wall 1c in the X-axis direction.

The plurality of pins 22 are provided on the base plate 24. The plurality of pins 22 have the same cylindrical shape as in the first embodiment and connected with the surface of the base plate 24. A plurality of pins 26 as ribs are further provided on the base plate 24. The plurality of pins 26 may have the same cylindrical shape as that of the plurality of pins 22. The pins 22 and the pins 26 are alternately arranged in the pitch $P_1$ in the Y-axis direction. It is supposed that the pins 22 and the pins 26 adjacent in the Y-axis direction are pins 22-1 and 22-2 and pins 26-1 and 26-2. At this time, the line containing the pin 22-2 and the pin 26-2 is adjacent to the line containing the pin 22-1 and the pin 26-1 apart from the latter line by a pitch $P_2$ in the X-axis direction, and arranged to be shifted in the Y-axis direction by a half pitch $P_1/2$ from the latter line.

FIG. 7B shows a sectional view of the heat exchange wall 1c shown in FIG. 7A along the A-A' line. The height H2 of the pin 26 in the direction perpendicular to the surface of the base plate 24 is shorter than the height H1 of the pin 22 in the direction perpendicular to the surface of the base plate 24 and desirably equal to or shorter than ½.

Such a heat exchange wall 1c is provided for the inside of the combustor liner 6 of the gas turbine and used similarly to the heat exchange wall 1a or 1b. The heat exchange wall 1c has a simple structure and consequently is easy to manufacture. The above-mentioned heat exchange wall 1c is small in pressure loss since the pin 26 is short.

Figure 15A:
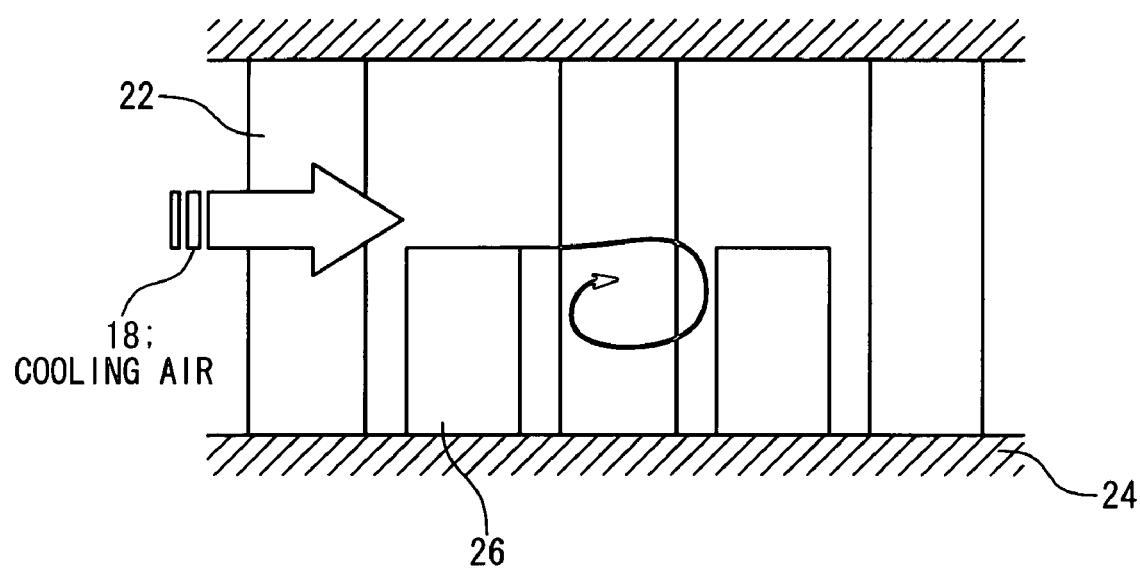
FIGS. 15A and 15B are diagrams showing turbulences generated in the third and fifth embodiments.
Figure 15B:
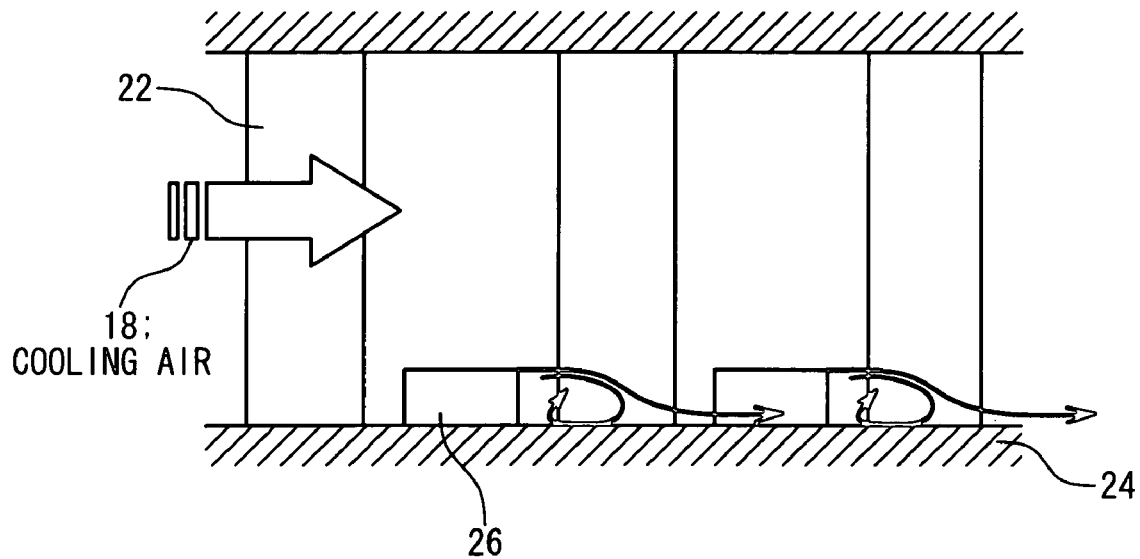
Figure 16A:
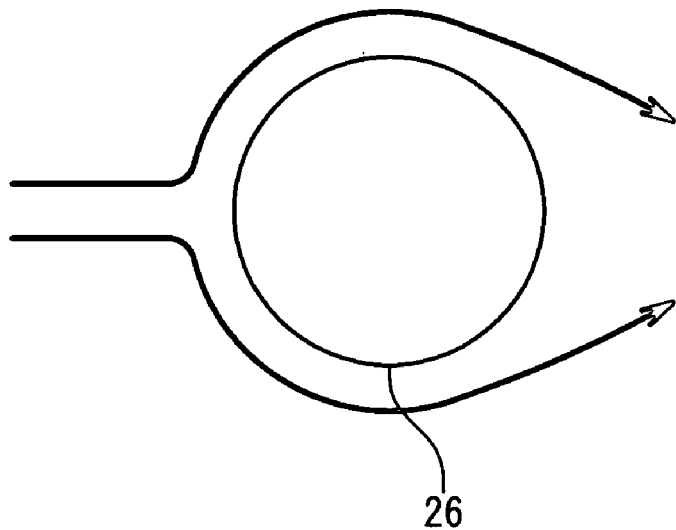
FIGS. 16A, 16B, 17A, and 17B are diagrams showing the cooling air flow in the sixth embodiment.
Figure 16B:
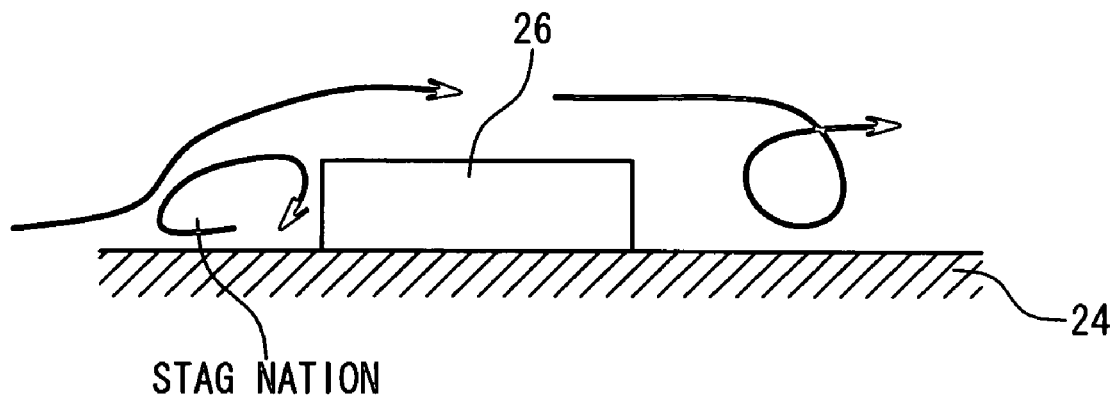

The round pins 22 and 26 can be easily manufactured, compared with the rectangular rib or parallelogram rib. Therefore, the third embodiment is optimal in case that the panel 14 is manufactured by the casting method. When the height of the rib 26 is low, turbulence generated by the top portion of the rib 26 reaches the base plate surface to promote heat exchange, as shown in FIGS. 15A and 15B. Especially, the structure shown in FIG. 15B is effective in case that the pin 22 has a low thermal conductivity. This is because the base plate 24 can be cooled more efficiently by cooling the surface of the base plate 24 directly rather than cooling the side face of the pin 22 of the low thermal conductivity. When the diameter of round rib 26 is small, the projection area in the direction of the cooling air flow decreases so that the pressure loss can be suppressed.

Figure 8A:
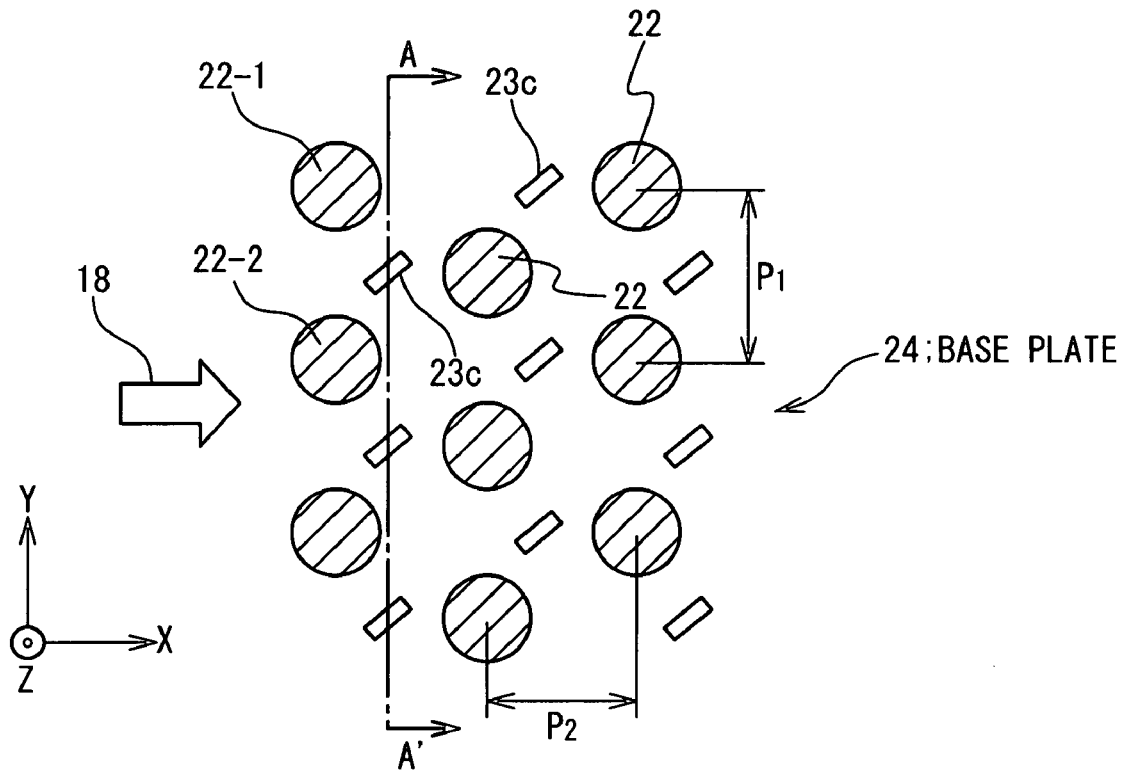
FIGS. 8A and 8B are a plan view and a sectional view showing the heat exchange wall according to a fourth embodiment of the present invention.
Figure 8B:
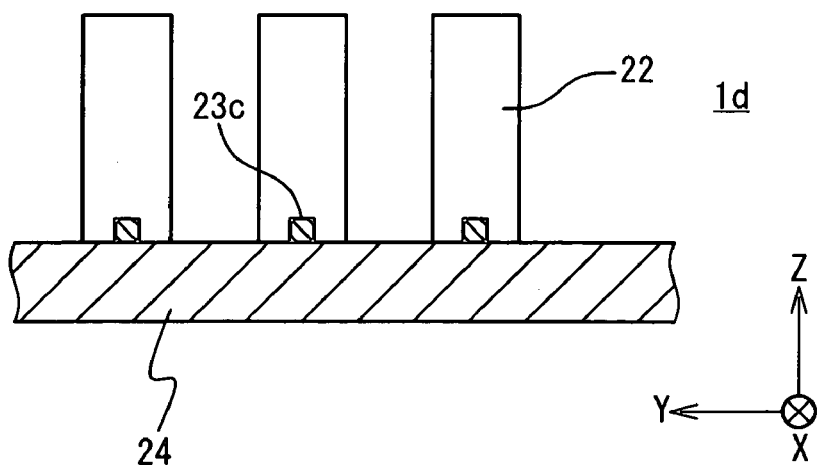

Next, FIGS. 8A and 8B are a plan view and a cross sectional view showing the heat exchange wall 1d according to the fourth embodiment of the present invention. Referring to FIG. 8A, the pins 22 and ribs 23c on the heat exchange wall 1d are arranged such that the cooling air 18 averagely flows in the X-axis direction.

The plurality of pins 22 are provided on the base plate 24. The plurality of pins 22 have the same cylindrical shape as in the first embodiment and are connected with the surface of the base plate 24. The pins 22 are arranged in the pitch $P_1$ in the Y-axis direction. It is supposed that the two pins 22 adjacent in the Y-axis direction are a pin 22-1 and a pin 22-2 in a line.

Another line containing the pins 22 is separated from the line by the pitch $P_2$ in the X-axis direction, and the other line containing the pins 22 is arranged to be shifted by the half pitch $P_1/2$ in the Y-axis direction. For each of the pins 22, the rib 23c is provided on the upstream side of the flow of the cooling air 18. The cross section of the rib 23c parallel to the surface of the base plate 24 is rectangular and the longer side extends in the direction of 45 degrees from the X-axis in a counterclockwise direction.

FIG. 8B shows a sectional view of the heat exchange wall 1d along the A-A" line shown in FIG. 8A. Such a heat exchange wall 1d is provided for the inside of the combustion liner 6 of the combustor 2 of the gas turbine and used similarly to the heat exchange walls 1a to 1c. The above-mentioned heat exchange wall 1d is high in cooling efficiency because the turbulences generated by the ribs 23c are efficiently hit against the pins 22 in its downstream direction.

Figure 14A:
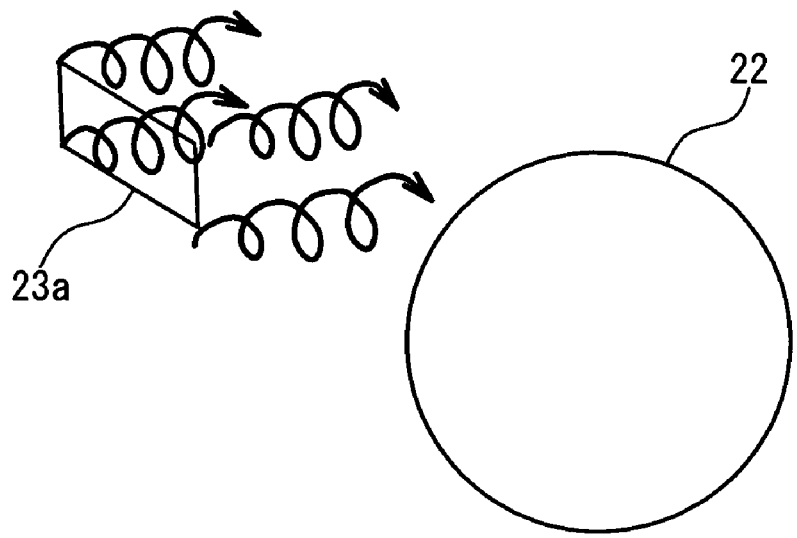
FIGS. 14A and 14B are diagrams showing turbulences generated in the fourth embodiment.
Figure 14B:
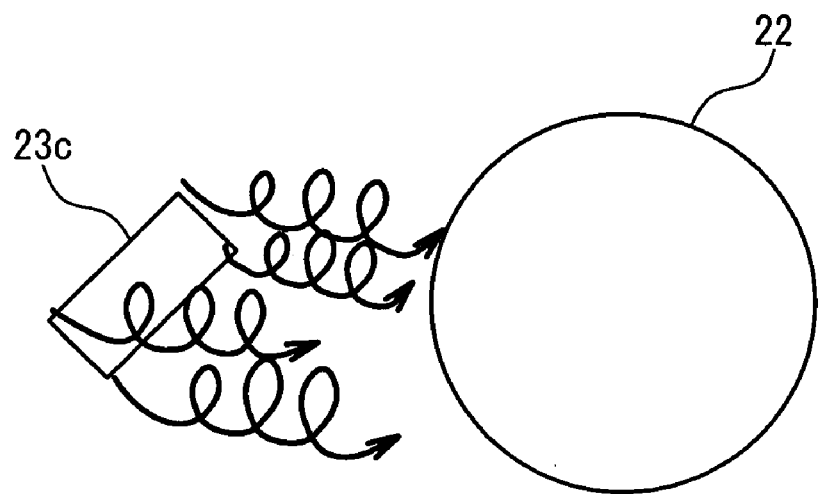

In the fourth embodiment, as shown in FIG. 14B, turbulences generated by the corners of the rectangular rib 23c hit the side surface of the round pin 22 to promote heat exchange in the side surface of the pin 22, compared with a case shown in FIG. 14A. In the case shown in FIG. 14A, the heat exchange is promoted in both of the side surface of the round pin 22 and the surface of the base plate 24. The rectangular rib or protrusion 23c is arranged in such a way that the longer side of the rib 23c has 45 degrees with respect of the cooling air flow. As a result, turbulences are generated at the four corners of the rectangular rib 23c and hit the round pin 22 as a wide turbulence flow. Therefore, the fourth embodiment is effective when the round pin 22 has a high thermal conductivity. That is, it is effective when the rectangular rib 23c is arranged in front of the round pin 22, the rib 23c is inclined with respect of the cooling air flow, and the pin 22 has the high thermal conductivity.

Next, FIGS. 9A and 9B are a plan view and a cross sectional view showing the heat exchange wall 1e according to the fifth embodiment of the present invention. Referring to FIG. 9A, the heat exchange wall 1e is provided for the average flow of the cooling air 18 in the X-axis direction.

The plurality of pins 22 are provided on the base plate 24. The plurality of pins 22 have the same cylindrical shape as in the first embodiment and are connected with the surface of the base plate 24. The pins 22 are periodically arranged in the pitch $P_1$ in the Y-axis direction. It is supposed that the two pins 22 adjacent in the Y-axis direction are a pin 22-1 and a pin 22-2 in a line. Another line of the pins 22 containing the pin 22-3 is adjacent in the pitch $P_2$ in the X-axis direction from the line of the pin 22-1 and the pin 22-2, and is shifted by a half of the pitch, $P_1/2$, in the Y-axis direction with respect to the line of the pin 22-1 and the pin 22-2. A small pin 27 is provided on the center position between every two pins 22 adjacent to each other in the Y-axis direction. Also, two of the small pins 27 are provided for each of the pins 22 on the upstream side of the flow of the cooling air 18. The small pins 27 are formed on the base plate 24 to have a same cylindrical shape. A diameter of the section of the small pin 27 is smaller than a diameter of the section of the pin 22.

FIG. 9B shows the cross sectional view of the heat exchange wall 1e along the A-A' line of FIG. 9A. A height H3 of the small pin 27 in the direction perpendicular to the base plate 24 is equal to or less than the half of the height H1 of the pin 22. Preferably, the height H3 is between 1/20 and 1/4 of the height H1. More preferably, the height H3 is 1/10 of the height H1.

Such a heat exchange wall 1e is provided for the inside of the combustion liner 6 of the combustor 2 of the gas turbine and used similarly to the heat exchange wall 1a to 1d. The above-mentioned heat exchange wall 1e is high in the cooling efficiency because the small pin 27 is provided between every two pins 22 and in front of the pin 22 and the turbulence generated by the small pin 27 is efficiently hit against the vicinity of the base portion of the pins 22. Therefore, the further improved cooling efficiency can be achieved, compared with the effect described in the third embodiment.

Figure 10A:
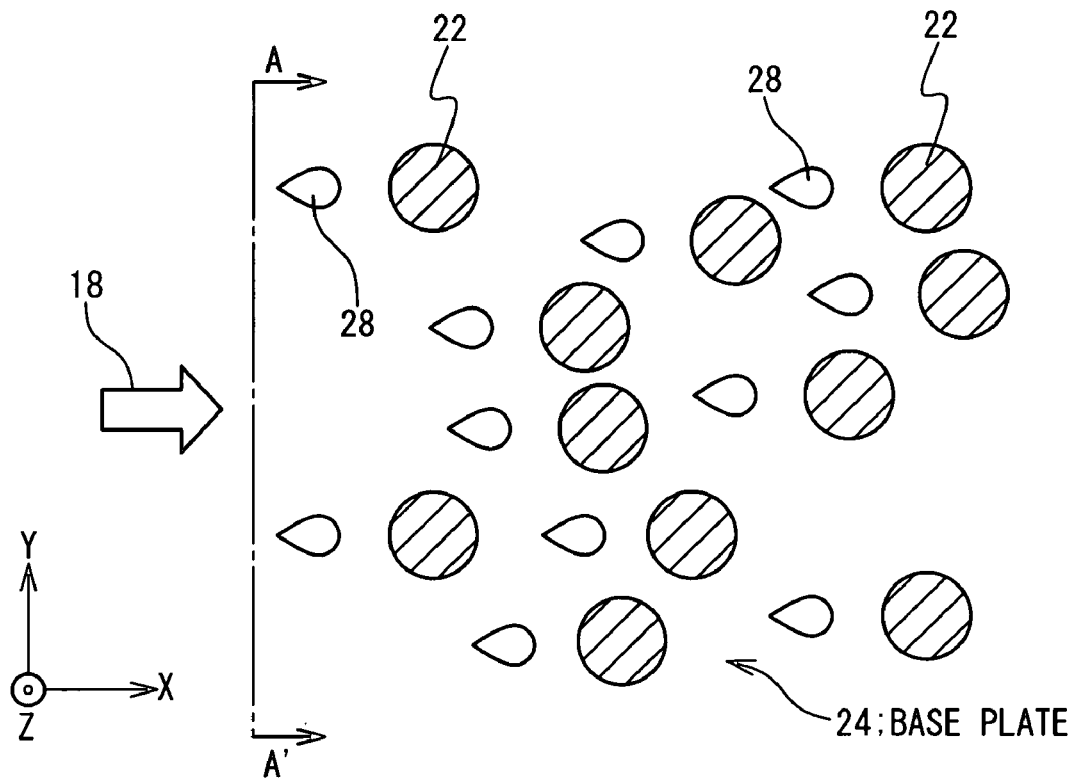
FIGS. 10A and 10B are a plan view and a sectional view showing the heat exchange wall according to a sixth embodiment of the present invention.
Figure 10B:
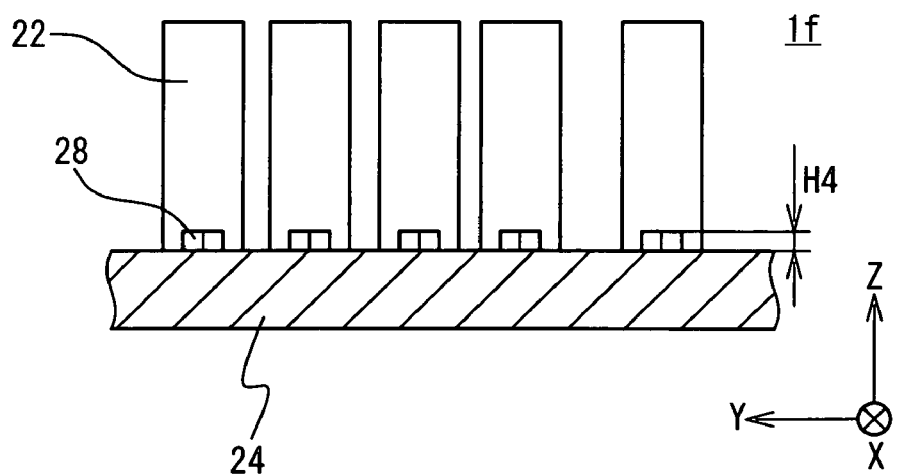

Next, FIGS. 10A and 10B are a plan view and a cross sectional view showing the heat exchange wall 1f according to the sixth embodiment of the present invention. Referring to FIG. 10A, the heat exchange wall 1f is provided on the downstream side of the average flow of the cooling air 18 in the X-axis direction.

The plurality of pins 22 are provided distributedly on the surface of the base plate 24. The positions on which the plurality of pins 22 are provided are random. Each of the pins 22 is the same cylindrical shape as in the above-mentioned embodiments.

Each of ribs 28 is provided on the upstream side of the flow of the cooling air 18 from a corresponding one of the pins 22 to have a predetermined distance. The cross section of the rib 28 parallel to the surface of the base plate 24 is tear-shaped in which one end has the shape of a circular arc and the other end has an acute angle between two sides in contact with each other.

FIG. 10B shows a sectional view of the heat exchange wall 1f along the A-A' line of FIG. 10A. The height H4 of the rib 28 in the direction perpendicular to the base plate 24 is equal to or less than the half of the height H1 of the pin 22. Preferably, the height H4 is between 1/20 and 1/4 of the height H1. More preferably, the height H4 is 1/10 of the height H1.

Such a heat exchange wall 1f is provided for the inside of the combustion liner 6 of the combustor 2 of the gas turbine and used similarly to the heat exchange walls 1a to 1e. When the cooling air 18 flows through the flow path having the above-mentioned heat exchange wall 1f, the turbulences are generated on the downstream side of the rib 28. Thus, the base portion of the pin 22 can be efficiently cooled on the downstream side of each rib 28. Since each rib 28 is tear-shaped, the turbulences are efficiently generated on the downstream side without any large increase in the pressure loss, resulting in further improvement of the cooling efficiency.

Figure 17A:
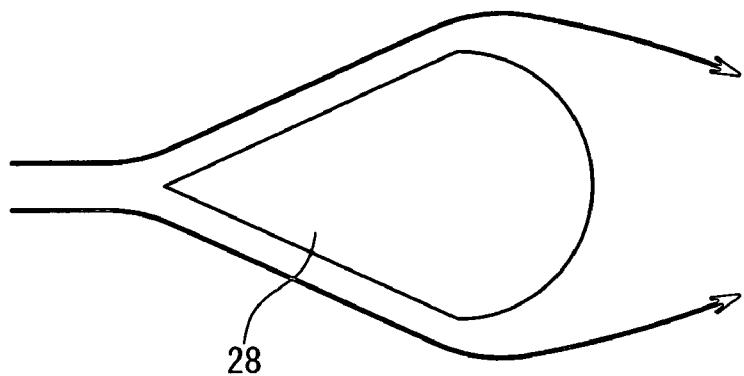
Figure 17B:
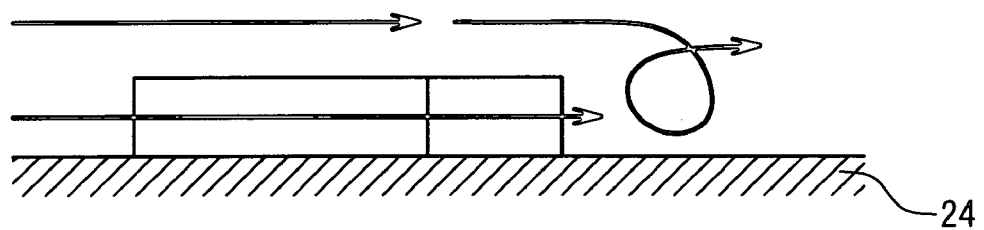
Figure 17C:
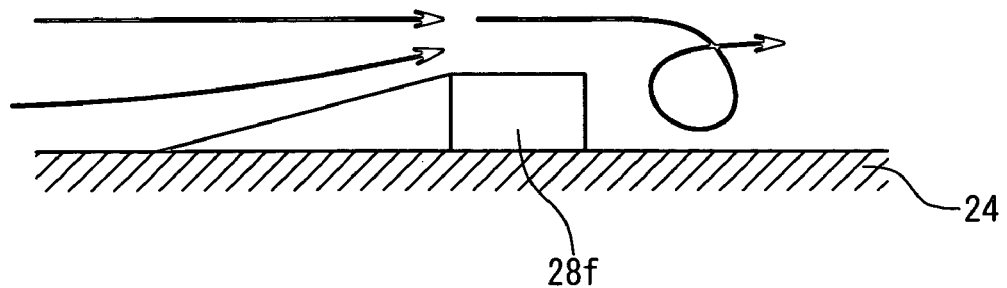
FIG. 17C is a diagram showing a modification of the sixth embodiment.

In the sixth embodiment, by adopting the rib of the tear shape with a wedge on the side of the upper stream of the cooling air flow, the generation of stagnation can be avoided and the generation of recirculation and the pressure loss can be reduced, as shown in FIGS. 16A, 16B, 17A and 17B. In addition, the rib shown in FIG. 17C may be adopted. In this case, the rib 28f has an inclined wedge portion and a semicircular cylinder portion. Thus, the pressure loss can be further reduced.

Figure 11:
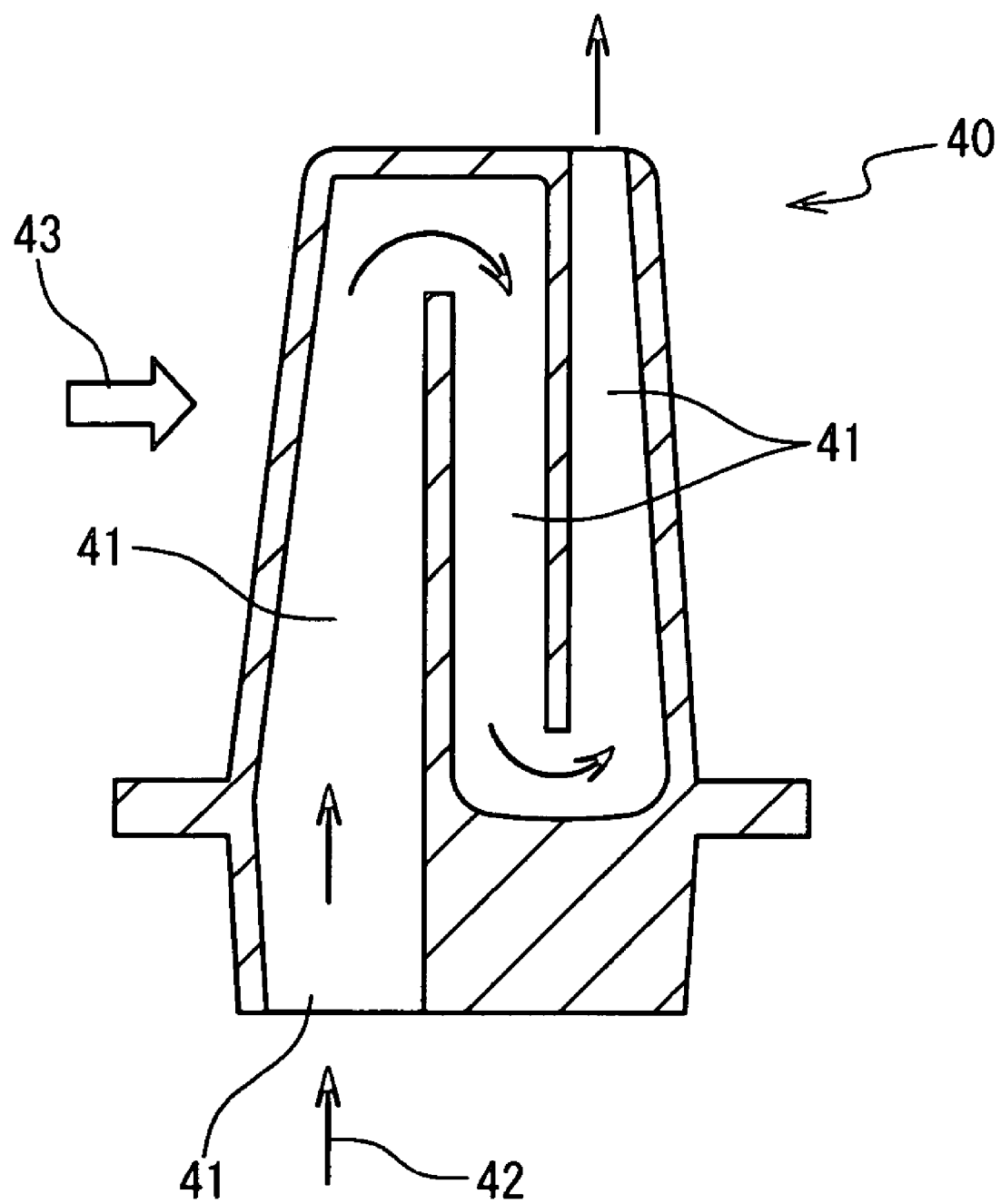
FIG. 11 is a cross sectional view showing a rotor blade of a gas turbine with the heat exchange wall of the present invention.

Next, in the seventh embodiment of the present invention, the heat exchange wall of the present invention is used to cool the dynamic blade of the turbine. With reference to FIG. 11, a cooling path 41 is provided in the rotor blade 40 of the gas turbine to send a cooling medium 42 therein. The inner wall of the cooling path 41 is covered with the heat exchange wall 1 (1a to 1f) in which the pins 22 are provided towards the inner side of the cooling path 41. The structure of the heat exchange wall 1 is the same as the structure of any of the first to sixth embodiments.

When the gas turbine is operated, a high temperature gas 43 is blown towards the rotor blade 40, and the rotor blade 40 is rotated around a rotation shaft (not shown). The cooling medium 42 is supplied from the base portion of the rotor blade 40 into the cooling path 41. The cooling medium 42 takes away the heat from the rotor blade 40 and is discharged to a path through which the high temperature gas 43 flows. The heat exchange wall 1 is provided on the inner wall of the cooling path 41 to efficiently transfer the heat of the rotor blade 40 to the cooling medium 42.

Since the rotor blade 40 is efficiently cooled by the heat exchange wall 1, it is preferably used in the gas turbine in which the higher temperature gas 43 is used. Or, the flow rate of the cooling medium 42 is little as compared with the gas turbine to which the temperature of the combustion gas 43 is equal.

The cooling structure such as this rotor blade 40 can be applied as the cooling structure for the stator blade of the gas turbine, and provides the similar effect.

In the above description, various embodiments are described. However, an optional combination of the embodiments may be carried out. For example, the first embodiment shown in FIGS. 2A and 2B and the third embodiment shown in FIGS. 7A and 7B may be combined. Thus, the cooling efficiency can be further improved.

According to the present invention, the heat exchange wall is provided which is high in heat exchange efficiency. Also, the heat exchange wall is provided which is high in heat exchange efficiency and cheap. Also, it is possible to cool a combustor of a gas turbine at a high efficiency, and it is possible to reduce an exhaust amount of NOx.

What is claimed is:

1. A gas turbine comprising:
an outer wall liner in which a combustion chamber is formed; and a heat exchange wall provided inside said outer wall liner, wherein a cooling medium flows through a space between said outer wall liner and said heat exchange wall, said heat exchange wall comprising:
a base plate;
a plurality of first protrusions provided on said base plate; and
a plurality of second protrusions provided on said base plate,
wherein a plurality of lines of said first protrusions are periodically arranged in a first pitch in a first direction,
wherein said first protrusions in each of the plurality of lines of said first protrusions are periodically arranged in a second pitch in a second direction orthogonal to said first direction,
wherein adjacent two lines of the plurality of lines of said first protrusions are arranged to be shifted by a half of said first pitch,
wherein a plurality of lines of said second protrusions are periodically arranged in said first pitch in said first direction,
wherein each of the plurality of lines of said second protrusions is arranged between adjacent two of the lines of said first protrusions,
wherein a cooling air flows in said second direction, wherein said second protrusions direct the cooling air towards said first protrusions,
wherein each of the first protrusions has a pair of second protrusions directly upstream, and wherein each pair of said second protrusions converges from their upstream ends to their downstream ends.

2. The gas turbine according to claim 1, further comprising: a plurality of third protrusions distributedly provided on said base plate surface.

3. The gas turbine according to claim 1, wherein at least one of said plurality of second protrusions is provided in a front portion of each of said plurality of first protrusions with respect to said cooling air flow.

4. The gas turbine according to claim 1, wherein one of said plurality of second protrusions is arranged between adjacent two of said first protrusions of each of the lines.

5. The gas turbine according to claim 1, wherein
a cross section of each of said plurality of first protrusions parallel to said base plate surface is a circle, and
a cross section of each of said plurality of second protrusions parallel to said base plate surface is a rectangle.

* * * * *